(12) United States Patent
Moshfeghi

(10) Patent No.: US 8,344,949 B2
(45) Date of Patent: Jan. 1, 2013

(54) WIRELESS POSITIONING APPROACH USING TIME-DELAY OF SIGNALS WITH A KNOWN TRANSMISSION PATTERN

(75) Inventor: Mehran Moshfeghi, Rancho Palos Verdes, CA (US)

(73) Assignee: Golba LLC, Rancho Palos Verdes, CA (US)

( * ) Notice: Subject to any disclaimer, the term of this patent is extended or adjusted under 35 U.S.C. 154(b) by 146 days.

(21) Appl. No.: 12/833,938

(22) Filed: Jul. 9, 2010

(65) Prior Publication Data

US 2010/0271263 A1     Oct. 28, 2010

Related U.S. Application Data

(63) Continuation-in-part of application No. 12/059,558, filed on Mar. 31, 2008, now Pat. No. 7,800,541.

(60) Provisional application No. 61/224,347, filed on Jul. 9, 2009, provisional application No. 61/231,905, filed on Aug. 6, 2009.

(51) Int. Cl.
    *G01S 3/02*     (2006.01)
(52) U.S. Cl. ..................... 342/457; 342/464
(58) Field of Classification Search .......... 342/378, 342/387, 457, 458, 464; 455/456.1, 456.6
See application file for complete search history.

(56) References Cited

U.S. PATENT DOCUMENTS

| | | | |
|---|---|---|---|
| 3,303,501 A | 2/1967 | Mahoney | |
| 3,778,159 A | 12/1973 | Hines et al. | |
| 4,283,726 A | 8/1981 | Spence et al. | |
| 4,851,851 A | 7/1989 | Hane | |
| 5,365,516 A | 11/1994 | Jandrell | |
| 5,874,914 A | 2/1999 | Krasner | |
| 5,999,124 A | 12/1999 | Sheynblat | |
| 6,131,067 A | 10/2000 | Girerd et al. | |
| 6,185,427 B1 | 2/2001 | Krasner et al. | |
| 6,204,765 B1 | 3/2001 | Brady et al. | |
| 6,215,441 B1 | 4/2001 | Moeglein et al. | |

(Continued)

FOREIGN PATENT DOCUMENTS

JP     2006/112822     4/2006

(Continued)

OTHER PUBLICATIONS

Portions of prosecution history of U.S. Appl. No. 12/059,558, Aug. 20, 2010, Moshfeghi, Mehran.

(Continued)

*Primary Examiner* — Dao Phan
(74) *Attorney, Agent, or Firm* — Adeli & Tollen, LLP

(57) ABSTRACT

A method of determining the location of a mobile device is provided. The method receives a signal with a known radio transmission pattern at the mobile device from each of several transmitting devices. The method correlates each received signal with a corresponding signal that has a same known radio transmission pattern to determine the time the signal traveled between the corresponding transmitting device and the mobile device. The method determines the location of the mobile device based on the time the signal travelled between the corresponding transmitting device and the mobile device. In some embodiments, determining the location of the mobile device does not require calculating a distance between the mobile device and any of the transmitting devices. In some embodiments determining the location of the mobile device includes solving a function that is dependent on the time the signals traveled between each corresponding transmitting device and the mobile device.

29 Claims, 19 Drawing Sheets

U.S. PATENT DOCUMENTS

| | | | |
|---|---|---|---|
| 6,295,019 | B1 | 9/2001 | Richards et al. |
| 6,496,806 | B1 | 12/2002 | Horwitz et al. |
| 6,577,238 | B1 | 6/2003 | Whitesmith et al. |
| 6,659,344 | B2 | 12/2003 | Otto et al. |
| 6,693,592 | B2 | 2/2004 | Dowdle et al. |
| 6,717,516 | B2 | 4/2004 | Bridgelall |
| 6,731,908 | B2 | 5/2004 | Berliner et al. |
| 6,750,769 | B1 | 6/2004 | Smith |
| 6,859,761 | B2 | 2/2005 | Bensky et al. |
| 6,868,073 | B1 | 3/2005 | Carrender |
| 6,920,330 | B2 | 7/2005 | Caronni et al. |
| 7,026,935 | B2 | 4/2006 | Diorio et al. |
| 7,038,573 | B2 | 5/2006 | Bann |
| 7,045,996 | B2 | 5/2006 | Lyon et al. |
| 7,057,492 | B2 | 6/2006 | Jackson et al. |
| 7,119,736 | B2 | 10/2006 | Heide et al. |
| 7,119,738 | B2 | 10/2006 | Bridgelall et al. |
| 7,161,470 | B2 | 1/2007 | Berquist et al. |
| 7,205,931 | B2 | 4/2007 | Gila et al. |
| 7,228,228 | B2 | 6/2007 | Bartlett et al. |
| 7,548,153 | B2 | 6/2009 | Gravelle et al. |
| 7,580,378 | B2 | 8/2009 | Carrender et al. |
| 7,800,541 | B2 | 9/2010 | Moshfeghi |
| 2003/0176196 | A1 | 9/2003 | Hall et al. |
| 2004/0002305 | A1 | 1/2004 | Byman-Kivivuori et al. |
| 2004/0185873 | A1 | 9/2004 | Gilkes et al. |
| 2004/0243588 | A1 | 12/2004 | Tanner et al. |
| 2004/0260506 | A1 | 12/2004 | Jones et al. |
| 2005/0030160 | A1 | 2/2005 | Goren et al. |
| 2005/0036460 | A1 | 2/2005 | Dougherty et al. |
| 2005/0088284 | A1 | 4/2005 | Zai et al. |
| 2005/0129139 | A1 | 6/2005 | Jones et al. |
| 2005/0198228 | A1 | 9/2005 | Bajwa et al. |
| 2005/0237953 | A1 | 10/2005 | Carrender et al. |
| 2005/0242188 | A1 | 11/2005 | Vesuna |
| 2005/0245235 | A1 | 11/2005 | Vesuna |
| 2005/0281363 | A1 | 12/2005 | Qi et al. |
| 2006/0012465 | A1 | 1/2006 | Lee et al. |
| 2006/0068750 | A1 | 3/2006 | Burr |
| 2006/0114104 | A1 | 6/2006 | Scaramozzino |
| 2006/0170565 | A1 | 8/2006 | Husak et al. |
| 2006/0170591 | A1 | 8/2006 | Houri |
| 2006/0197652 | A1 | 9/2006 | Hild et al. |
| 2006/0217131 | A1 | 9/2006 | Alizadeh-Shabdiz et al. |
| 2006/0267731 | A1 | 11/2006 | Chen |
| 2007/0045424 | A1 | 3/2007 | Wang |
| 2007/0046467 | A1 | 3/2007 | Chakraborty et al. |
| 2007/0075838 | A1 | 4/2007 | Powell |
| 2007/0099627 | A1 | 5/2007 | Kofol et al. |
| 2007/0103303 | A1 | 5/2007 | Shoarinejad |
| 2007/0216540 | A1 | 9/2007 | Riley et al. |
| 2007/0252758 | A1 | 11/2007 | Loomis |
| 2008/0008109 | A1 | 1/2008 | Ollis |
| 2008/0045236 | A1 | 2/2008 | Nahon et al. |
| 2008/0088452 | A1 | 4/2008 | Agrawal et al. |
| 2008/0143482 | A1 | 6/2008 | Shoarinejad et al. |
| 2008/0143584 | A1 | 6/2008 | Shoarinejad et al. |
| 2008/0167049 | A1 | 7/2008 | Karr et al. |
| 2008/0278328 | A1 | 11/2008 | Chand et al. |
| 2008/0284646 | A1 | 11/2008 | Walley et al. |
| 2008/0318579 | A1 | 12/2008 | McCoy et al. |
| 2009/0033462 | A1 | 2/2009 | Kitayoshi et al. |
| 2009/0121927 | A1 | 5/2009 | Moshfeghi |
| 2010/0309051 | A1 | 12/2010 | Moshfeghi |
| 2011/0043407 | A1 | 2/2011 | Moshfeghi |

FOREIGN PATENT DOCUMENTS

| | | |
|---|---|---|
| WO | WO 2005/091997 | 10/2005 |
| WO | WO 2007/056333 | 5/2007 |
| WO | WO 2009/124071 | 10/2009 |

OTHER PUBLICATIONS

International Search Report & Written Opinion for PCT/US2009/038992, May 20, 2009 (mailing date), Shoarinejad, Kambiz.

IPRP for PCT/US2009/038992, Oct. 5, 2010 (date of issuance), Shoarinejad, Kambiz.

Author Unknown "Four Challenges", Month Unknown, 2004, pp. 1-7.

Author Unknown, "Cisco Application-Oriented Networking Facilitates Intelligent Radio Frequency Identification Processing at the Edge", Month Unknown, 2005, pp. 1-9.

Author Unknown, "ConnecTerra Product Family", www.connecterra.com, Month Unknown, 2005, pp. 1-2.

Author Unknown, "Delivering An Intelligent Foundation for RFID: Maximizing Network Efficiency With Cisco RFID Solutions", Month Unknown, 2005, pp. 1-6.

Author Unknown, "Establishing the Foundation for Enterprise-Scale RFID Deployments", www.connecterra.com/products/rftagaware.php, Sep. 2005, pp. 1-2.

Author Unknown, "Installation Manual R500HA Long Range RFID Reader", www.iautomate.com, Month Unknown, 2005, pp. 1-40.

Author Unknown, "Issues on range and accuracy of RFID-radar™ system", RFID-rader accuracy report, Feb. 2006, pp. 1-4.

Author Unknown, "OFDM for Mobile Data Communications," International Engineering Consortium, Month Unknown, 2007.

Author Unknown, "The Sun Global RFID Network Vision: Connecting Businesses at the Edge of the Network", A Technical White Paper, Jul. 2004, pp. 1-20.

Author Unknown, RFTag Aware™ Enterprise Server, Centralized EPC Data Management and Reporting for Enterprise-Scale RFID Deployments, www.connecterra.com, Month Unknown, 2005, pp. 1-2.

Bahl, Paramvir, et al., "RADAR: An In-Building RF Based User Location and Tracking System", in Proceedings of IEEE Infocom, Mar. 2000, pp. 775-784, vol. 2.

Chon, Hae Don, et al., "Using RFID for Accurate Positioning", Journal of Global Positioning Systems, Feb. 3, 2005, pp. 32-39, vol. 3, No. 1-2.

Clark, Sean, et al., "Auto-ID Savant Specification 1.0", Month Unknown, 2003, pp. 1-58.

Donghyun Kim, et al., "GPS Ambiguity Resolution and Validation: Methodologies, Trends, and Issues," $7^{th}$ GNSS Workshop—International Symposium on GPS/GNSS, Nov. 30-Dec. 2, 2000, Seoul, Korea.

Gustafsson, Fredrik, et al., "Mobile Positioning Using Wireless Networks" IEEE Signal Processing Magazine, Jul. 2005, pp. 41-53.

Harter, Andy, et al., "A Distributed Location System for the Active Office", IEEE Network, Jan. 1994, vol. 8, No. 1.

Kulyukin, Vladimir et al., "RFID in Robot Assisted Indoor Navigation for the Visually Impaired", Research Paper, Utah State University, Feb. 2004.

Lamarca, Anthony, et al., "Place Lab: Device Positioning Using Radio Beacons in the Wild." In Pervasive Computing, Month Unknown, 2005, pp. 116-133.

Maes, Pattie, et al., "Unveiling the "Sixth Sense," Game Changing Wearable Tech." TED 2009, Long Beach, CA USA, Month Unknown, 2009 http://www.ted.com/index.php/talks/pattie_maes_demos_the_sixth_sense.html the source video / home page (A1, A2) for the Video Clip.

Miller, Leonard E., "Why UWB? A Review of Ultra wideband Technology" National Institute of Standards and Technology, DARPA, Apr. 2003, pp. 1-72, Gaithersburg, Maryland.

Miller, Leonard E., "Wireless Technologies and the SAFECOM SoR for Public Safety Communications", National Institute of Standards and Technology, Month Unknown, 2005, pp. 1-68, Gaithersburg, Maryland.

Muthukrishnan, Kavitha, et al., "Towards Smart Surroundings: Enabling Techniques and Technologies for Localization." In: 1st Int. Workshop on Location- and Context-Awareness (LoCA), May 2005, pp. 350-362, University of Twente, the Netherlands.

Okabe, Masanobu, et al., "A Car Navigation System Utilizing a GPS Receiver", 1993 IEEE, Mar. 1993, pp. 278-279.

Patwari, Neal, et al., "Locating the Nodes" IEEE Signal Processing Magazine, Jul. 2005, pp. 54-69.

Philipose, Matthai, et al., "Mapping and Localization with RFID Technology", Intel Research White Paper, Dec. 2003.

Reynolds, Matthew, et al., "Design Considerations for embedded software-defined RFID Readers", Emerging Wireless Technology/ A Supplement to RF Design, Aug. 2005, pp. 14-15.

Sayed, Ali H., et al., "Network-Based Wireless Location", IEEE Signal Processing Magazine, Jul. 2005, pp. 24-40.

Sebum Chun, et al., "Performance Analysis of GPS Integer Ambiguity Resolution Using External Aiding Information," Journal of Global Positioning Systems, Month Unknown, 2005, pp. 201-206 vol. 4, No. 1-2.

Sun, Guolin, et al., "Signal Processing Techniques in Network-Aided Positioning", IEEE Signal Processing Magazine, Jul. 2005, pp. 12-23.

Turin, G., et al., "Simulation of Urban Vehicle-Monitoring Systems", IEEE Transactions on Vehicular Technology, Feb. 1972, pp. 9-16, vol. VT-21, No. 1.

Want, Roy., et al., "The Active Badge Location System", ACM Trans. Inf. Syst., 10(1): pp. 91-102, Month Unknown, 1992.

Portions of prosecution history of U.S. Appl. No. 12/843,868, Dec. 22, 2011, Moshfeghi, Mehran.

Portions of prosecution history of U.S. Appl. No. 12/852,443, Mar. 12, 2012, Moshfeghi, Mehran.

WIRELESS POSITIONING APPROACH USING TIME-DELAY OF SIGNALS WITH A KNOWN TRANSMISSION PATTERN

CLAIM OF BENEFIT TO PRIOR APPLICATIONS

The present Application is a continuation-in-part of and claims priority to U.S. patent application Ser. No. 12/059,558, entitled "Methods and Systems for Determining the Location of an Electronic Device", filed Mar. 31, 2008, published as U.S. Patent Publication No. 2009-0243932 A1, and now issued as U.S. Pat. No. 7,800,541. The present application also claims the benefit of U.S. Provisional Application 61/224,347, entitled "Method and System for Determining the Position of a Mobile Station," filed Jul. 9, 2009. The present application also claims the benefit of U.S. Provisional Application 61/231,905, entitled "Method and System for Determining the Position of a Mobile Station," filed Aug. 6, 2009. The contents of U.S. Patent Publication No. 2009-0243932 A1, now issued as U.S. Pat. No. 7,800,541, U.S. Provisional Application 61/224,347, and U.S. Provisional application 61/231,905 are hereby incorporated by reference.

BACKGROUND

Location-aware technologies compute the location of an object. These systems differ in terms of accuracy, coverage, cost of installation, and maintenance. Global Positioning Systems (GPSs) use satellite signals and work in outdoor environments. GPS systems, however, require direct line of sight and do not work in an indoor environment.

Systems have been developed in the past that use the strength of wireless access point beacon signals in an outdoor environment to calculate the position of a mobile user. The active badge system uses infrared (IR) technology but it has several limitations such as limited range of IR, direct line-of-sight requirements for IR, and the high-cost of installation of a dedicated system just for object tracking. Another early indoor object tracking system was the Active Bat system. This system used time-of-flight of ultrasound transmissions between ultrasound transmitters that are attached to the object and ceiling mounted receivers. Again, this system was a dedicated system dedicated to object and people tracking and was not commercially successful because it required installation of a new infrastructure.

One technique developed was to create a database of wireless beacons and use that information together with the signals received by a mobile to compute the location of the mobile. Other techniques use Radio Frequency (RF) wireless signal strength information and triangulation to locate objects in an indoor environment. However, these methods provide poor indoor positioning accuracy because RF signal amplitude is greatly affected by metal objects, reflective surfaces, multipath, dead-spots, noise and interference.

Other methods use time of arrival information of cellular RF signals and cell tower (i.e., base stations of licensed wireless systems) triangulation to determine a coarse radio-based position and then use that to assist a GPS system to determine the GPS-based position. Cell tower triangulation is limited in accuracy and reliability because of the coarse number of cell towers and multipath issues. Also, these methods require the presence of a GPS signal and a GPS time reference for measuring time of arrival of cellular RF signals. Their approach does not work in indoor situations where GPS signals are weak or not present. These methods also require time synchronization and prior knowledge of the position of cellular base-stations. Other methods have also used cellular tower triangulation to determine a coarse pre-fix position and use that to assist a GPS system determine the GPS-based position.

BRIEF SUMMARY

Some embodiments provide a multilateration method for locating objects in an indoor setting. The method can also be applied to outdoor settings where GPS signals are weak such as urban canyons, tunnels, and locations that are surrounded by tall buildings.

Some embodiments employ a known Radio Frequency (RF) transmission pattern to locate a receiver object. As the signal travels between a transmitter and a receiver, the time delay between the two is calculated. By repeating this process with different known coordinate transmitters it is possible to process the time delay information and calculate the unknown position coordinates of the receiver. This calculated position can then be used for location-based services, gaming consoles, and hand gesture recognition systems. The method can be applied to any system that uses a known transmission pattern such as Bluetooth®, Wireless Local Area Network (WLAN), cellular (e.g., 2G, 3G, 4G), Worldwide Interoperability for Microwave Access (WiMax), HD Radio™, Ultra-wideband (UWB), ZigBee, Radio-Frequency Identification (RFID), and 60 GHz standards. This method is low-cost since it can use existing standards and infrastructure. The method is also complementary to GPS since it works in indoor locations, tunnels, and urban canyons where GPS signals may be weak and/or multipath issues could be present. The method is also complementary or instead of cell tower triangulation methods using RF signals since the method works in indoor locations, tunnels, and any area where cellular (i.e., licensed wireless) signals may be weak and/or multipath issues could be present.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
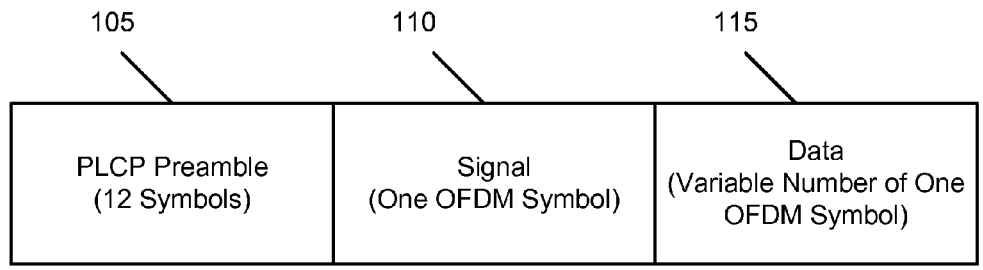
FIG. 1 illustrates the frame format in the 802.11a standard.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide methods and systems that employ a known Radio Frequency (RF) transmission pattern to locate a receiver object. As the signal travels between a transmitter and a receiver the system calculates the time delay between the two. By repeating this process with different known coordinate transmitters it is possible to process the time delay information and calculate the unknown position coordinates of the receiver. This calculated position can then be used for location-based services, gaming consoles, and hand gesture recognition systems. The method can be applied to any system that uses a known transmission pattern such as Bluetooth®, WLAN, cellular (e.g., 2G, 3G, 4G), WiMax, HD Radio™, UWB, RFID, ZigBee, and 60 GHz standards. This method is low-cost since it can use existing standards and infrastructure. It is also complementary to GPS since it works in indoor locations, tunnels and urban canyons, where GPS signals may be weak and/or multipath issues could be present.

Some embodiments provide a method of determining the location of a mobile device. The method receives a signal with a known radio transmission pattern at the mobile device from each of several transmitting devices. The method correlates each received signal with a corresponding signal that has a same known radio transmission pattern to determine the time the signal traveled between the corresponding transmitting device and the mobile device. The method determines the location of the mobile device based on the time the signal travelled between the corresponding transmitting device and the mobile device.

In some embodiments, determining the location of the mobile device does not require calculating a distance between the mobile device and any of the transmitting devices. In some embodiments determining the location of the mobile device includes solving a function that is dependent on the time the signals traveled between each corresponding transmitting device and the mobile device. In some embodiments, the known radio transmission pattern includes a known signal preamble and correlating each received signal with a corresponding signal includes correlating the preamble of the received signal with the preamble of the corresponding signal with the same known radio transmission pattern. In some embodiments, the corresponding signals that have the same known radio transmission pattern are generated at the mobile device. In some embodiments, at least one received signal includes a group of pilots. The method extracts the pilots from the signal and uses the pilots in determining the time the signal travelled between the corresponding transmitting device and the mobile device.

In some embodiments, each of the transmitting devices includes a clock and the clocks of the transmitting devices are synchronized with each other. In some embodiments, the mobile device and each of the transmitting devices include a clock and the mobile device and each transmitting device include a set of radio frequency (RF) components. The method synchronizes the clocks of the transmitting devices, places the mobile device next to one of the transmitting devices, and calculates a constant delay that includes an offset of the mobile device clock with respect to the clocks of the transmitting devices, a delay which is caused by the mobile device RF components, and a delay which is caused by each transmitting device RF components. The method uses the constant delay in determining the location of the mobile device.

In some embodiments, each of the transmitting devices includes a clock and the clocks of the transmitting devices are not synchronized with each other. In some embodiments, determining the time the signal travelled between each transmitting device and the mobile device includes determining a time of arrival delay of the received signal. In some embodiments determining the time the signal travelled between each transmitting device and the mobile device includes determining a time when the power of the received signal transitions from a first value to a second value where the second value is higher than the first value.

Some embodiments provide a system for playing games. The system includes a game console for playing a game; a remote controller for controlling a game played on the game console; and several transmitting devices that are communicatively coupled to the remote controller. Each transmitting device is configured to transmit one or more signals with known radio transmission patterns to the remote controller.

The remote controller is configured (1) to receive the signals from transmitting devices, (2) to correlate each received signal with a corresponding signal that has a same known radio transmission pattern to determine a time the signal traveled between the corresponding transmitting device and the remote controller, and (3) to determine the location of the remote controller based on the time the signal travelled between the corresponding transmitting device and the remote controller.

In some embodiments, determining the location of the remote controller does not require calculating a distance between the remote controller and any of the transmitting devices. In some embodiments determining the location of the mobile device includes solving a function that is dependent on the time the signals traveled between each corresponding transmitting device and the remote controller. In some embodiments, the known radio transmission pattern includes a known signal preamble and correlating each received signal with a corresponding signal includes correlating the preamble of the received signal with the preamble of the corresponding signal with the same known radio transmission pattern. In some embodiments, the transmitting devices are configured to synchronize their clocks with each other. In some embodiments, determining the time the signal travelled between each transmitting device and the remote controller includes determining a time of arrival delay of the received signal. In some embodiments, determining the time the signal travelled between each transmitting device and the remote controller includes determining a time when the power of the received signal transitions from a first value to a second value, the second value being higher than the first value.

Some embodiments provide a system for determining a hand gesture of a human. The system includes a radio frequency (RF) device for placing on a finger of the human. The RF device is configured to transmit signals with known radio transmission patterns. The system also includes several receiving devices that are communicatively coupled to the RF device. Each receiving device is configured to receive signals with the known radio transmission patterns from the RF device and to correlate the received signals with a corresponding signal that has a same known radio transmission pattern to determine a time the signal traveled between the RF device and the receiving device. At least one of the receiving devices is further configured to receive the time the signal traveled between the RF device and each of the other receiving devices and to determine a location of the RF device based on the time the signal travelled between the RF device and each of the receiving devices.

In some embodiments, the system includes several RF devices and one of the receiving devices is configured to schedule the transmission of the signals from each of the RF devices to the receiving devices. In some embodiments, determining the location of the RF device does not require calculating a distance between the RF device and any of the receiving devices. In some embodiments determining the location of the RF device includes solving a function that is dependent on the time the signals traveled between RF device and each corresponding receiving device. In some embodiments, each of the receiving devices includes a clock and is configured to synchronize its clocks with the clocks of the other receiving devices.

In some embodiments, determining the time the signal travelled between the RF device and each receiving device includes determining a time of arrival delay of the received signal. In some embodiments, determining the time the signal travelled between the RF device and each receiving device includes determining a time when the power of the received signal transitions from a first value to a second value, the second value being higher than the first value.

Some embodiments provide a method of determining the location of a mobile device. The mobile device includes several antennas for receiving signals. The method receives signals with known radio transmission pattern at each of the mobile device antennas. The method correlates each received signal with a corresponding signal that has the same known radio transmission pattern to determine the time the signal traveled between a corresponding transmitting device and the mobile device antenna. The method determines the location of each of the mobile device antennas based on the time the signal travelled between the corresponding transmitting device and the mobile device antenna. The method determines the location of the mobile device based on the location of the antennas.

In some embodiments, the mobile device receives signals from several transmitting devices and determining the location of each of the plurality of mobile device antennas and determining the location of the mobile device does not require synchronizing the transmitting devices with each other. In some embodiments, a particular transmitting device includes several antennas for transmitting signals and the mobile device receives signals from each of the antennas of the particular transmitting device. In some embodiments, determining the location of the mobile device does not require calculating a distance between the mobile device and any transmitting devices. In some embodiments determining the location of the mobile device includes solving a function that is dependent on the time the signals traveled between the corresponding transmitting device and the mobile device antenna. In some embodiments, at least one of the transmitting devices has several antennas for transmitting signals.

Some embodiments provide a method of determining the location of a mobile device. The method receives signals with known radio transmission pattern at the mobile device from a set of transmitting devices. At least one of the transmitting devices has several antennas for transmitting signals. The method correlates each received signal with a corresponding signal that has the same known radio transmission pattern to determine the time the signal traveled between a corresponding transmitting device antenna and the mobile device. The method determines the location of the mobile device based on the time the signal travelled between the corresponding transmitting device antennas and the mobile device. In some embodiments, the mobile device has several antennas for receiving signals.

Several more detailed embodiments of the invention are described in sections below. Before describing these embodiments further, Section I provides an overview of several terms and concepts used in some embodiments. Next, Section II discusses using OFDM signal time delay to locate a mobile device. Section III describes calculating location of a mobile device. Next, Section IV describes several examples of location-based services that can benefit from the embodiments of the present invention. Finally, section V provides a description of a computer system with which some embodiments of the invention are implemented.

I. Terms and Concepts

A. Inphase and Quadrature

A general wireless system includes a transmitter component and a receiver component. The transmitter first performs digital modulation of data into an analog baseband signal. Analog modulation then shifts the center frequency of the analog signal up to the radio carrier, and the antenna transmits the signal. The receiver's antenna receives the analog radio signal and uses the known carrier to demodulate the signal into the analog baseband signal. The receiver's baseband then converts the analog baseband signal into digital data. In a direct down-conversion receiver the carrier frequency is directly converted to two baseband signals, the in-phase signal I(t) and the quadrature phase signal, Q(t).

The modulated physical signal (the passband or RF signal) can be represented by a complex value called "the equivalent baseband signal":

$$Z(t)=I(t)+j\,Q(t)$$

where I(t) is the inphase signal, Q(t) the quadrature phase signal, and j is the imaginary unit. The frequency spectrum of this signal includes negative as well as positive frequencies.

The physical passband signal corresponds to the real portion of the above formula:

$$I(t)\cos(wt)-Q(t)\sin(wt)=Re\{Z(t)e^{jwt}\}$$

where W is the carrier angular frequency in radian per second. In an "equivalent baseband model" of a communication system, the modulated signal is replaced by a complex valued "equivalent baseband signal" with carrier frequency of 0 hertz, and the RF channel is replaced by an "equivalent baseband channel model" where the frequency response is transferred to baseband frequencies. Thus, the down conversion procedure replaces a real channel with a complex equivalent.

B. Convolution

Convolution is a mathematical operation on two functions that produces a third function that is typically viewed as a modified version of one of the original functions. In signal processing, convolution is the process of constructing the output of an electronic system for any arbitrary input signal by using the impulse response of system.

C. Multipath

Multipaths occur when the signals from the transmitters are received at a receiver after the signals are reflected by objects such as buildings around the receiver. Multipaths specially happen in areas with many buildings, such as city centers. As described in detail below, although multipath propagation is considered as interference in other systems and degrade their performance, different embodiments of the invention take advantage of multipath signals to determine position of mobile devices with higher accuracy.

D. Symbol

A symbol is a state or significant condition of a communication channel that persists for a fixed period of time. A transmitter places symbols on the channel at a known symbol rate and the receiver detects the sequence of symbols and reconstructs the transmitted data. A significant condition is one of several values of a signal parameter that is chosen to represent information.

E. OFDM

Orthogonal frequency division multiplexing (OFDM), or multi-tone modulation as it is sometimes called, is a communications technique that divides a communications channel into a number of equally spaced frequency bands. A sub-carrier that carries a portion of the user information is transmitted in each band. Each sub-carrier is orthogonal (independent of each other) with every other sub-carrier, differentiating OFDM from the commonly used frequency division multiplexing (FDM). OFDM allows the spectrum of each tone to overlap because the tones are orthogonal and do not interfere with each other. The overall amount of spectrum that is required is reduced because the tones overlap.

OFDM is presently used in a number of commercial wired and wireless applications. On the wired side, OFDM is used for a variant of digital subscriber line (DSL). For wireless applications, OFDM is the basis for several television and radio broadcast applications, including the European digital broadcast television standard, as well as digital radio in North America. OFDM is also used in several fixed wireless systems and wireless local-area network (LAN) products. A system based on OFDM has been developed to deliver mobile broadband data service at data rates comparable to those of wired services, such as DSL and cable modems.

OFDM systems spread the data to be transmitted over a large numbers of carriers, each of which is modulated at a low rate. The tones in OFDM have the very special property of being the only Eigen-functions of a linear channel. This prevents interference between adjacent tones in OFDM systems. Individual sub-channels can be completely separated by the receiver's fast Fourier transform (FFT) if there are no Inter-Symbol Interference (ISI) and Inter-Carrier Interference (ICI) introduced by the channel. Multipath propagation can cause linear distortions, spread energy into adjacent channels, and cause ISI and ICI. OFDM systems are more robust to multipath effects and prevent ISI and ICI by creating a cyclically extended guard interval called a cyclic prefix, where each OFDM symbol is preceded by a periodic extension of the signal. ISI and ICI can be eliminated when the guard interval is longer than the channel impulse response or multipath delay. The overhead introduced by the cyclic prefix, however, increases with the length of the cyclic prefix. OFDM systems also reduce frequency selective fading by averaging over all frequencies.

Throughout this specification the wireless LAN IEEE 802.11a standard is used to demonstrate the invention. However, one of ordinary skill in the art would realize that the disclosed methods can be applied to any system that has a pre-amble structure such as Bluetooth®, WLAN, cellular (e.g., 2G, 3G, 4G), WiMax, HD Radio™, UWB, RFID, ZigBee, and 60 GHz standards. The proposed methodology works as long as both the transmitter and receiver use the same standard.

II. Using OFDM Signal Time Delay to Locate a Mobile Receiver

FIG. 1 illustrates the frame format in the 802.11a standard. As shown, the frame includes a Physical Layer Convergence Protocol (PLCP) Preamble field 105 (which includes 12 symbols), a SIGNAL field 110 (which includes one OFDM symbol) and a Data field 115 (which includes a variable number of OFDM symbols). The LENGTH and RATE of the Data symbols are included in the SIGNAL field and are required to decode the DATA symbols. The standards document describes these fields in detail.

Figure 2:
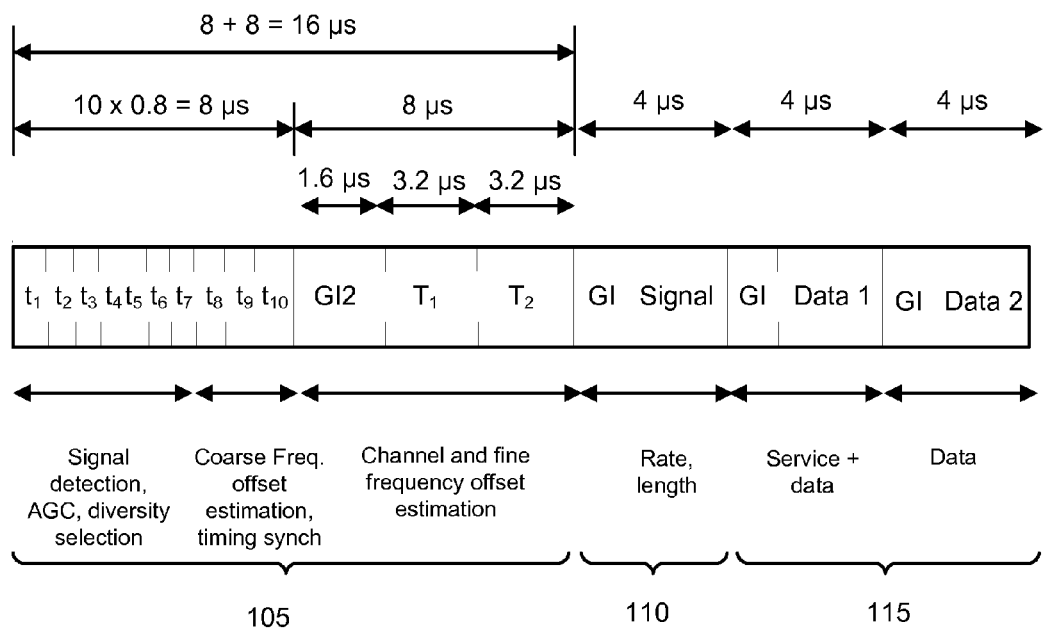
FIG. 2 illustrates the OFDM training structure in detail.

FIG. 2 illustrates the OFDM training structure in more detail. As shown, the PLCP preamble field 105 includes 10 short training sequences followed by a guard interval and two long training sequence. As shown, $t_1$ to $t_{10}$ denote short training symbols, GI2 denotes the guard interval, and $T_1$ and $T_2$ denote long training symbols. The PLCP preamble 105 is followed by the SIGNAL field 110 and DATA 115. The total training length is 16 µs. The boundaries in the figure denote repetitions due to the periodicity of the inverse Fourier transform.

The short training sequence can be used for Automatic Gain Control (AGC), diversity selection, timing acquisition, and coarse frequency acquisition. The long training sequence can be used for channel estimation and fine frequency acquisition. In some embodiments, channel estimation is used to calculate the time elapsed from the frame boundary corresponding to the earliest path from a transmitter to a receiver. Initially, some of the 10 short preamble sequences are used for AGC, frequency and time estimation and the remaining are used for time correlation. These remaining short preambles give coarse timing synchronization and narrow the range of correlation. The phase of the correlation evaluated at the peak also gives the coarse frequency estimate. Then the correlation of the long sequence gives the multipath profile. The earliest delay peak determined through this correlation corresponds to the direct line of sight distance between the transmitter and receiver. When there is no line of sight, the correlation peak corresponds to the shortest multipath. However, the effects of multipath can be mitigated by using more access points and averaging.

Figure 3:
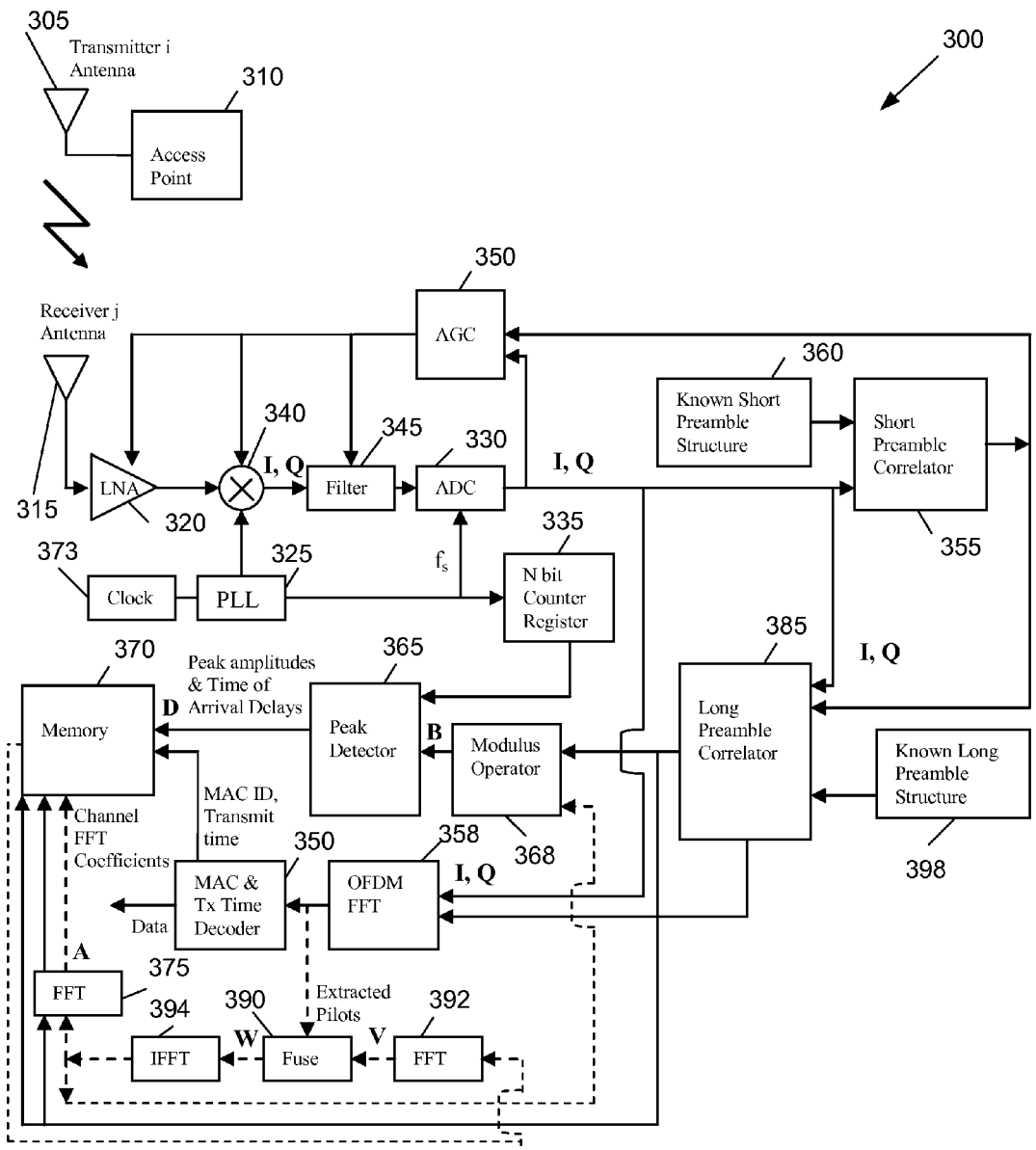
FIG. 3 conceptually illustrates a system of some embodiments that uses the known transmission pattern of the training structure to determine the time delay between a transmitter base station and a mobile receiver.

FIG. 3 conceptually illustrates a system 300 of some embodiments that uses the known transmission pattern of the training structure to determine the time delay between a transmitter base station and a mobile receiver. As shown, system 300 includes a transmitter 305 and a mobile device's receiver 315. An example of mobile device's receiver is an 802.11a receiver. One of ordinary skill in the art would realize that specific details of FIG. 3 are given as an example and it is possible to use different circuit implementations to achieve the same results without deviating from the teachings of the invention. Furthermore, the example of FIG. 3 uses the wireless LAN IEEE 802.11a standard to demonstrate methods of the invention using preamble correlation. However, one of ordinary skill in the art would realize that the disclosed methods can be applied to any system that has a known structure (e.g., a known preamble structure) such as Bluetooth®, GPS, WLAN, cellular (e.g., 2G, 3G, 4G), WiMax, HD Radio™, UWB, RFID, ZigBee, 60 GHz standards, and other RF signals with known structure. The proposed methodology works as long as both the transmitter and receiver use the same standard.

As shown, the receiver's baseband calculates channel's profile (see Marker B in FIG. 3), channel's FFT coefficients (see Marker A in FIG. 3), and time of arrival delay using preamble correlation (see Marker D in FIG. 3). The receiver's baseband uses correlation with the preamble training structure to determine the time delay between the transmitter 305 and the mobile device's receiver 315. In this example the receiver employs direct conversion where the carrier frequency is directly converted to two baseband signals; in-phase I and quadrature Q, which are then sampled by Analog-to-Digital-Converters (ADC) (see Markers I and Q in FIG. 3). The method, however, applies to other receiver architectures too, such as heterodyne or super heterodyne, where an ADC is used to sample the full signal bandwidth of interest.

The antenna 305 of the access point 310 transmits an RF waveform. The antenna 315 of the receiver j receives the RF signal after a delay corresponding to the distance between the two. The Low Noise Amplifier (LNA) 320 amplifies the received RF signal without increasing the noise level. A Phase Lock Loop (PLL) 325 generates a clock for down conversion as well as the clock ($f_s$) to sample the analog signal at the Analog to Digital Converter (ADC) 330 input. The PLL 325 clock is also used for an N bit counter register 335 that stores time delays. This register counts from 0 to (2N−1) and then wraps around back to zero. Therefore, the size of this register, N, should be large enough to represent the time delays that are expected so that time wrap around can be avoided. It should be noted that once the counter wraps around to zero, that portion of the time delay is lost. For instance, when the counter only goes up to 100 ms, a time delay of 115 ms will show up as 15 ms in the counter. When T is the largest time delay that is expected, the counter should be designed to be larger than T plus a delta, where delta is the maximum expected time offset error. The transmitter also has a counter that is synchronized with the counter of the receiver through calibration transmissions.

The mixer 340 uses the RF output of the LNA 320 and the PLL 325 signal to down convert the RF signal for baseband. The down-converted signal is a complex signal with in-phase (I) and quadrature (Q) components (see Markers I and Q in FIG. 3). The filter 345 rejects unwanted signals. The ADC 330 digitizes the signal. A time tracking loop is run so that the ADC sampling points are synchronized with the transmitted waveform. This means that the sampling points are identical and hence avoids interference between symbols (Inter-Symbol Interference or ISI). The amplitude of the ADC 330 output may be used for Automatic Gain Control (AGC) 350 so that front-end RF block settings are adjusted and the ADC output captures the main signal. The short preamble correlator 355 correlates its input signal with the signature of the short preamble received from known short preamble structure source 360 and its output adjusts the gain control settings. After the short preamble correlation is complete then the correlation with the long preamble structure is carried out.

Figure 4:
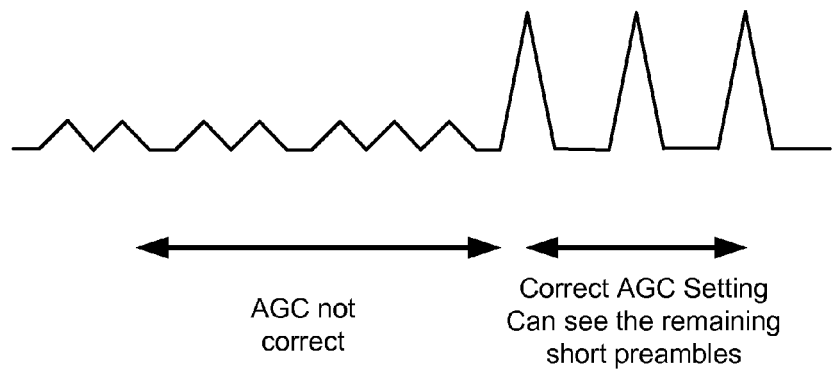
FIG. 4 illustrates an example of the output of the short preamble correlator in some embodiments.

FIG. 4 illustrates an example of the output of the short preamble correlator. The figure shows the magnitude of the output of the short preamble correlator 355 depicted against time. There is also a corresponding phase component since the signal is complex. In this example the gain control settings are not initially correct and the first few short preambles are not seen at the output of the correlator 355. But once the gain settings are adjusted the correlator 355 detects the last three short preambles. After the short preamble correlation is complete then the correlation with the long preamble structure is carried out.

Referring back to FIG. 2, the long preamble consists of two preamble symbols, $T_1$ and $T_2$. The short pre-amble correlator 355 also provides a coarse time estimate for the sliding window of the long preamble correlator 385, so that the correlation window starts just before $T_1$. The long preamble correlator 385 can correlate the I and Q received signal components against $T_1$ or against both $T_1$ and $T_2$ together (by using the signature of the long preamble received from known long preamble structure source 398). This is a complex correlation and the output of the long preamble correlator 385 therefore is a complex signal with real and imaginary components. The complex output of this correlator can in some embodiments be stored in memory to represent channel FFT coefficients, or be used together with extracted pilots to calculate more accurate channel FFT coefficients. A modulus operation is then carried out (by the modulus operator 368) on the output of the long preamble correlator where the absolute value magnitude of the complex signal is calculated. The magnitude of the output of the long preamble correlator 385 is marked B in FIG. 3.

Figure 5:
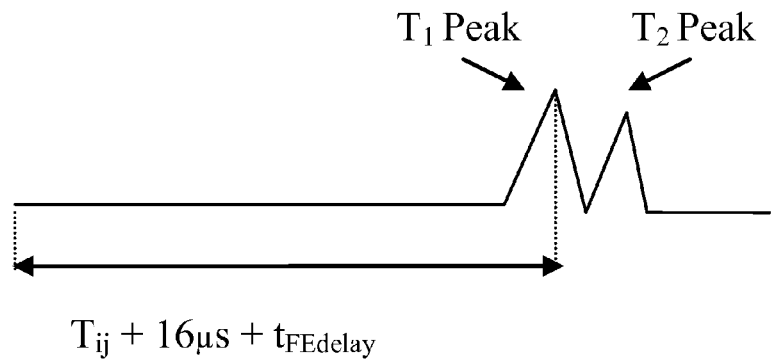
FIG. 5 conceptually illustrates magnitude output of a long preamble correlator of some embodiments.

The long preamble correlator 385 can correlate against $T_1$ or against both $T_1$ and $T_2$ together. When the correlator 385 correlates against $T_1$ and $T_2$ together, the magnitude output of the correlator 385 produces one peak that corresponds to the time delay with some offset. This is appropriate if $T_1$ and $T_2$ are autocorrelated. But in general the correlator 385 will correlate against $T_1$ and its magnitude output will, under ideal conditions, generate two peaks as shown in FIG. 5. The correlator 385 also has a corresponding phase output that is not shown. The first peak of the magnitude output corresponds to $T_1$ and the second peak corresponds to $T_2$. Since $T_1$ and $T_2$ are separated by 3.2 μs (as shown in FIG. 2) the second peak should under ideal situations be shifted by 3.2 μs. Thus, the peak detector 365 after the correlator 385 can either detect the first peak, or the peak detector can sum the signal with a 3.2 μs shifted version of itself before doing peak detection. The latter improves Signal to Noise Ratio (SNR) under noisy situations.

FIG. 5 conceptually illustrates magnitude output of a long preamble correlator of some embodiments. $T_{ij}$ denotes the time for the RF wave to travel from the transmitter's RF antenna i 305 to the receiver's RF antenna j 315. The transmitter's and receiver's front-end RF components (antenna, LNA, filter, ADC) introduce an additional delay, $t_{FEdelay}$, before the signal reaches the long-preamble correlator 385. This delay has a mean value with a small deviation for a given hardware. Therefore, the delay is treated as a constant in some embodiments. Also, the long preamble signal introduces an additional fixed delay of 16 µs since it has to wait for the arrival of both $T_1$ and $T_2$ before performing the correlation (8 µs for the first 10 short preambles, 1.6 µs for the guard interval, 3.2 µs for $T_1$ and 3.2 µs for $T_2$. It should be appreciated that when the correlation is done only against $T_1$, there is no need to wait for $T_2$. However, using both $T_1$ and $T_2$ increases the signal to noise ratio and improves the accuracy of the peak detection). Thus the location of the correlator's first peak corresponds to ($T_{ij}$+16 µs+$t_{FEdelay}$), which is travel time delay $T_{ij}$ subject to a fixed offset. The amplitude of the peaks and the value of the counter register 335 corresponding to the location of the peak is stored in memory 370.

After a time delay that is a system parameter, the system performs FFT on the OFDM signal symbol. The media access control address (MAC address or MAC ID) of the received RF signal, which is in the SIGNAL symbol, is computed with an OFDM FFT 358 and a MAC and transmission time decoder (Mac & Tx time decoder) 350. The OFDM FFT 358 uses the output of the long preamble correlator 385 in order to determine when to start the FFT. The OFDM FFT also discards the cyclic prefix. The MAC address is then saved in memory 370 so that stored time delays correspond to a particular access point's MAC address. The transmission time, represented by the transmitter's counter value at transmission, can be stored in the SIGNAL symbol. Mac & Tx Time decoder 350 also retrieves the transmission time with an FFT and stores it in memory 370. The difference between the transmitter's counter value at transmission and the receiver's peak detection counter value represents time of arrival plus system delays and synchronization offsets (which may be calibrated and compensated for). The data is also decoded with an equalizer (equalizer details are not shown in FIG. 3) which uses the channel coefficient estimates to do division and multiplication in the FFT domain to decode the data. The correlators do not have to run all the time and may go to sleep once the peak detector finds the first peak.

In 802.11 WLAN OFDM implementation, four of the subcarriers are dedicated to pilot signals. A total of 52 subcarriers are used where the pilots are inserted at positions −21, −7, 7 and 21. The remaining 48 positions are used for data and contain no channel information. Having these pilot signals inserted at those positions makes coherent detection robust against frequency offset and phase noise. The pilot signals are modulated by a pseudo binary sequence to prevent the generation of spectral lines. If packet sizes are long then the channel can change and one can use these pilots to update channel and time delay estimates. The pilots go through the channel and provide one measurement of the channel at their positions. The long preamble also goes through the channel and is then correlated with the original preamble structure. The output of the long preamble correlator 385, therefore, provides a second measurement of the channel at the pilot positions.

Referring back to FIG. 3, some embodiments optionally (shown with the dashed arrows) extract the pilots by an FFT and use them to improve the channel estimate and update the peak detector's output. To do this the extracted pilots are fused (by the fuse component 390) with the FFT (calculated by FFT module 392) of the previously stored long preamble correlator 385 output. This fusion step involves using weights to change the values of the FFT of the long preamble correlator 385 output at the pilot locations. The result then goes through an inverse FFT (IFFT) 394 step and the improved estimates are then fed back to modulus operator 368 and peak detector 365. Channel FFT coefficients are calculated by FFT module 375 and stored in memory 370.

A. Preamble Correlation and Pilot Channel Estimate

The following description uses an example where OFDM uses 52 frequency subcarriers with 4 pilot subcarriers (−21, −7, 7 and 21) and uses a 64 point FFT/IFFT, where the received signal is in the time domain and the receiver performs FFT to take the signal back into the frequency domain. Typically coefficients 1-26 are mapped to the same FFT/IFFT inputs, coefficients −26 to −1 are mapped to 38-63 FFT/IFFT inputs, and the remaining inputs (27 to 37 and 0) are set to 0. The received signal of a channel is convolution of the input signal with the impulse response of the channel. In the frequency domain this means that the FFT of the received signal is multiplication of the FFT of the input signal with the FFT of the impulse response of the channel. Therefore, the FFT of the received long preamble signal is multiplication of the FFT of the input signal with the FFT of the channel and is expressed by the following equation:

$$\text{FFT of the received long preamble}=L_m C_m$$

where Lm is the FFT of the transmitted long preamble signal; Cm is the channel FFT; and m is the subcarrier frequency index.

The long preamble correlator convolves the received signal with the conjugate of the long preamble (since the signal is a complex number). The result (shown as Marker V in FIG. 3) is expressed in the following equation:

$$V_m = |L_m|^2 C_m$$

where $m \in [-32, \ldots, 31]$.

The above Equation for $V_m$ gives one estimate of the channel. Suppose that $P_m$ are the transmitted pilots and $P'_m$ are the extracted pilots in FIG. 3. These extracted pilots also provide channel measurements at the pilot locations (indexes m equal to −21, −7, 7 and 21) as expressed in the following equation:

$$P'_m = \sigma \cdot C_m P_m$$

where $m \in [-21, -7, 7, 21]$ and $\sigma$ is a complex number that includes amplitude and phase offsets due to the effects of the channel and transmitter/receiver front-ends. Non-pilot index values of m contain data.

Some embodiments minimize the difference between these two channel measurements in order to calculate the offset, σ, and use that to improve the channel estimate and update the peak detector's output. An example is expressed in the following equation:

$$\min_\sigma \sum_m \left| \frac{P'_m}{\sigma P_m} - \frac{V_m}{|L_m|^2} \right|$$

where $m \in [-21, -7, 7, 21]$.

This minimization results in a value for the offset σ, which can then be used to modify $V_m$ at the 4 pilot locations. A weight, τ, can then be used to fuse the original measurement Vm with the modified version at the pilot locations as expressed in the following equation:

$$W = \tau V_m + \left[\frac{(1-\tau)|L_m|^2 P_m'}{\sigma P_m}\right]$$

where m ∈[−21, −7, 7, 21]. At non-pilot positions the weight, τ, is 1 so that the original $V_m$ values are retained. The weighted fused value (shown as Marker W in FIG. 3) then goes through an IFFT step 394 and fed back to the peak detector 365 through the modulus operator 386. FIG. 3 shows the channels FFT coefficients are also stored in memory. This can be done by performing an FFT on the improved pilot channel estimate, or by doing an FFT on the long preamble correlator output.

B. Alternative Embodiment Using RSSI

Figure 6:
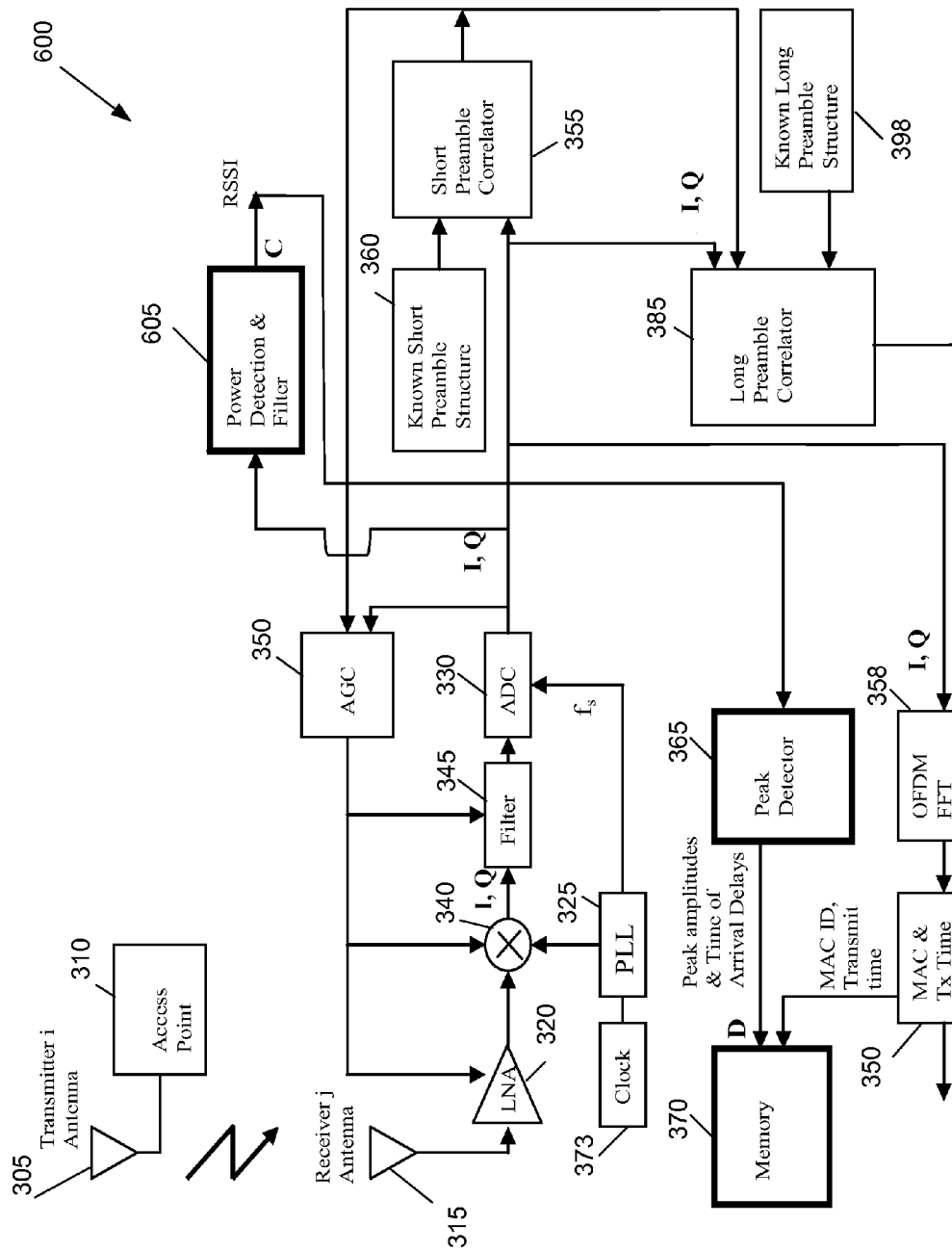
FIG. 6 conceptually illustrates a system of some embodiments that uses the Received Signal Strength Indication (RSSI) to determine the time delay between a transmitter base station and a mobile receiver.

Some embodiments (as described by reference to FIG. 3), measure time of arrival, where correlation with the known preamble transmitted structure is used. FIG. 6 illustrates an alternative embodiment that uses the time of arrival of the Received Signal Strength Indication (RSSI). One of ordinary skill in the art would realize that specific details of FIG. 6 are given as an example and it is possible to use different circuit implementations to achieve the same results without deviating from the teachings of the invention. Furthermore, the example of FIG. 6 uses the wireless LAN IEEE 802.11a standard to demonstrate methods of how to extract some of the channel's characteristics such as the time of arrival delay using RSSI transition. However, one of ordinary skill in the art would realize that the disclosed methods can be applied to any system that has a pre-amble structure such as Bluetooth®, GPS, WLAN, cellular (e.g., 2G, 3G, 4G), WiMax, HD Radio™, UWB, RFID, ZigBee, and 60 GHz standards. The proposed methodology works as long as both the transmitter and receiver use the same standard.

Figure 7:
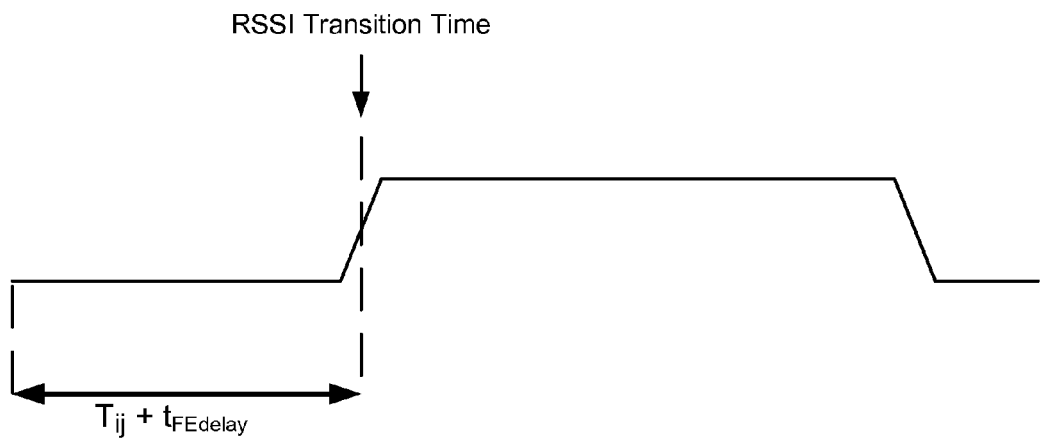
FIG. 7 illustrates an example of an RSSI signal output of some embodiments.

FIG. 7 conceptually illustrates an example of an RSSI signal output of some embodiments. RSSI measures the power in the received RF signal. The power detection & filter module 605 obtains the RSSI by squaring and summing the downcoverted in-phase (I) and quadrature (Q) signal components (see Markers I and Q in FIG. 6) and low pass filtering the results. When the receiver 315 receives a signal similar to the signal shown in FIG. 2, the RSSI signal (see Marker C in FIG. 6) is zero until the first training symbol, $t_1$, arrives. The signal then increases in value and stays up until the last data packet and then it transitions back down to zero.

Some embodiments measure the time corresponding to the middle of the RSSI transition edge, when the signal spikes from a value close to zero to its high power level. This time represents the time of arrival of the first short preamble training symbol, $t_1$, in FIG. 2. Since the RSSI transition time is calculated in firmware (performed by power detection & filter 605, peak detector 365, and stored in memory 370) it is possible to access it directly and use it instead of the preamble correlation peak delay.

The firmware also has its own clock for measuring time (same clock 373 that feeds the PLL 325 and the ADC 330). Therefore, using the RSSI transition time instead of the preamble correlation method has the advantage that it does not require the hardware changes of register counters for time measurements, since the function of the counter will be emulated in firmware albeit at lower time resolution. However, the RSSI transition time is less accurate than the preamble correlation peak delay in noisy environments. Also, when the peaks are close together they would overlap. The short and long preamble correlator blocks are still needed in order to determine the start time for the OFDM FFT. Other components of FIG. 6 are similar to those described by reference to FIG. 3 above. One of ordinary skill in the art would realize that specific details of FIG. 6 are given as an example and it is possible to use different circuit implementations to achieve the same results without deviating from the teachings of the invention.

C. Alternative Embodiment Using Round Trip Delay

An alternative to measuring time of arrival delay is to measure the round trip delay, which if correctly measured is twice the time of arrival delay. For the round trip delay the RF signal travels from a transmitter to a receiver, and the receiver sends an acknowledgement RF signal back to the transmitter which the transmitter receives. If the acknowledgement signal introduces additional delays because of the receiver or because of network congestion then such additional delays are noted. The round trip delay is then the time for the RF signal to travel from the transmitter to the receiver plus the time for the receiver's acknowledgment signal to get back to the transmitter minus any additionally introduced system time delays. In some embodiments, the receiver (e.g., the mobile device) sends the measured delay time back to the transmitter (e.g., the access point). The transmitter then adds the received measured delay time to the delay time measured by the transmitter to get the total round trip delay time. In yet other embodiments other channel parameters are used for positioning. These include channel FFT amplitude and phase, equalizer filter coefficients, time difference of arrival, beacon signal strength, angle of arrival, phase and amplitude of each pilot tone, and Doppler shift for moving objects.

III. Calculating Location of a Mobile Device

Figure 8:
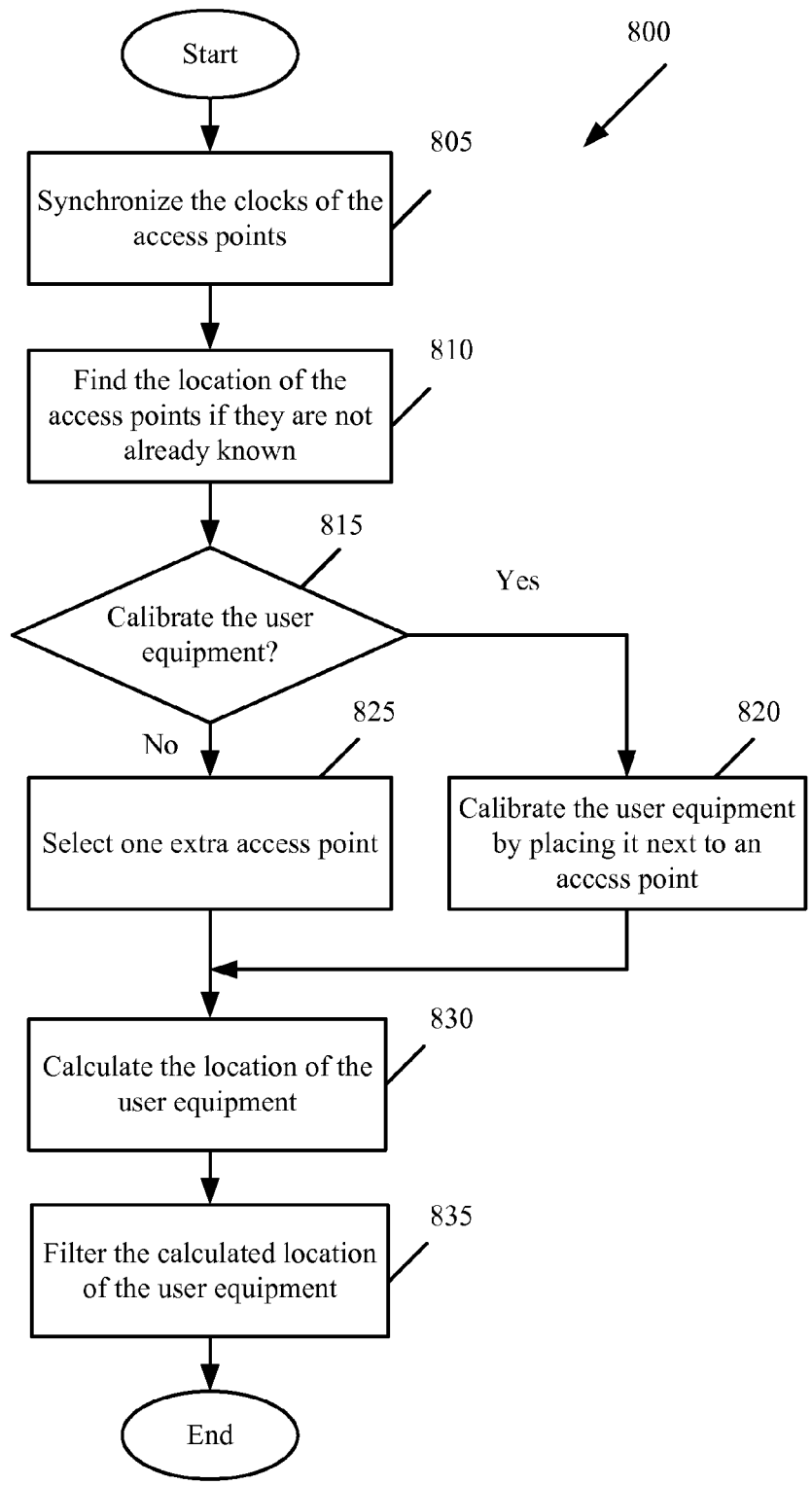
FIG. 8 conceptually illustrates a process for calculating the location of a mobile device using several access points in some embodiments.

FIG. 8 conceptually illustrates a process 800 for calculating the location of a mobile device using several access points in some embodiments. For simplicity, what is referred in this specification as a mobile device or a mobile station includes user equipments such as cellular telephones, personal communications service (PCS) telephones, wireless-enabled personal digital assistants, wireless modems, laptop computers, tablet computers, smart phones, handheld devices that include short range radios (such as IEEE 802.11 or Bluetooth® but do not have cellular phones), and the like. Details of this process are described by reference to several other figures. As shown in FIG. 8, the process synchronizes (at 805) the clocks of the different access points. Synchronizing the access points clocks is describes in more detail by reference to FIG. 9 below. Next, the process calculates (at 810) the positions of the access points if they are not already known. This calculation is described by reference to FIG. 11 below. The process then determines (at 815) whether to calibrate the mobile device. When the process determines that calibration is required, the process calibrates (at 820) the mobile device. The calibration reduces the number of access points that are needed by one. Otherwise, the process selects (at 825) one more access point for determining the location of the mobile device. The calibration is described by reference to FIG. 13 below. Since calibrating the mobile device is optional, some embodiments skip steps 815-825 above.

Next, the process calculates (at 830) the position of the mobile device. This calculation is described by reference to FIG. 12 below. The process then optionally filters and smoothes (at 835) the calculated location of the mobile using previous position and velocity data.

Figure 14:
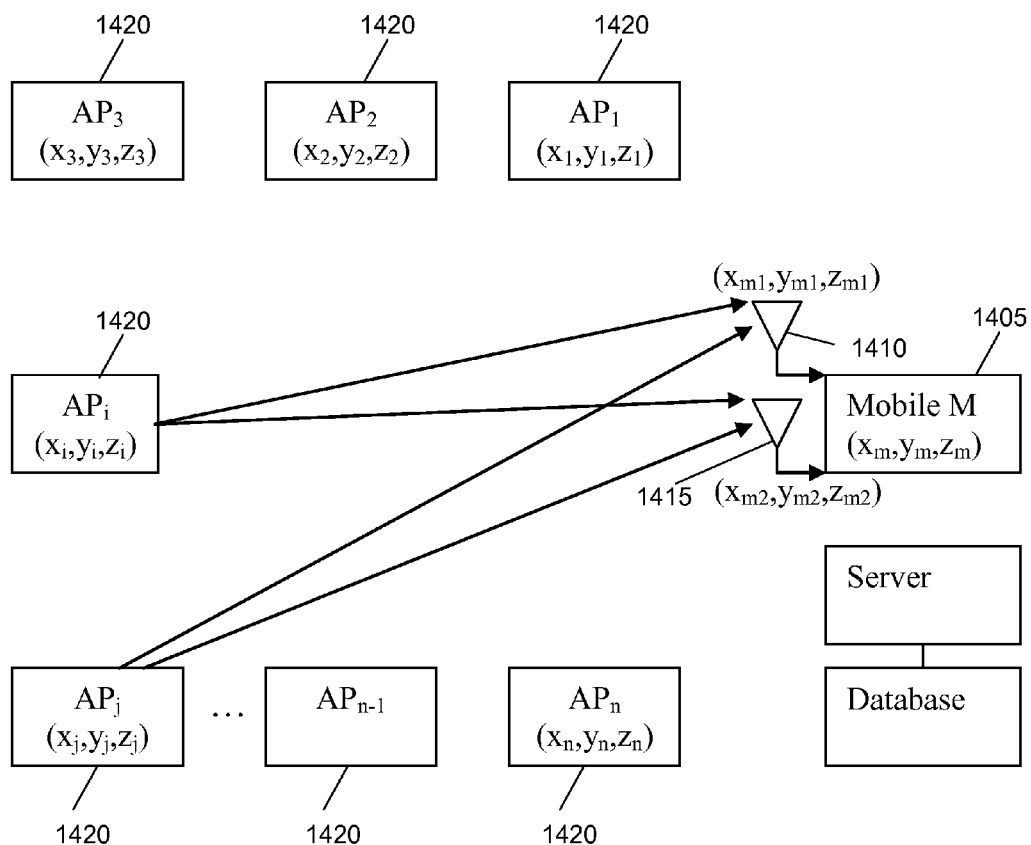
FIG. 14 conceptually illustrates a receiver with two antennas in some embodiments.
Figure 15:
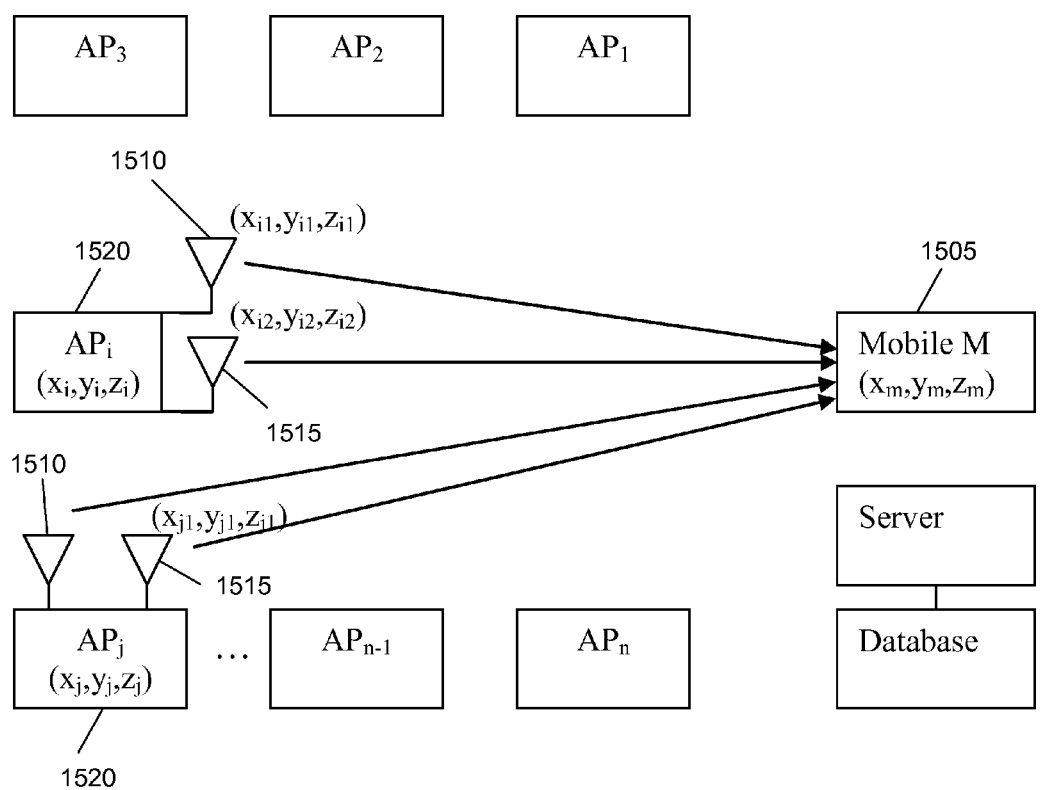
FIG. 15 conceptually illustrates access points that have two antennas in some embodiments.
Figure 16:
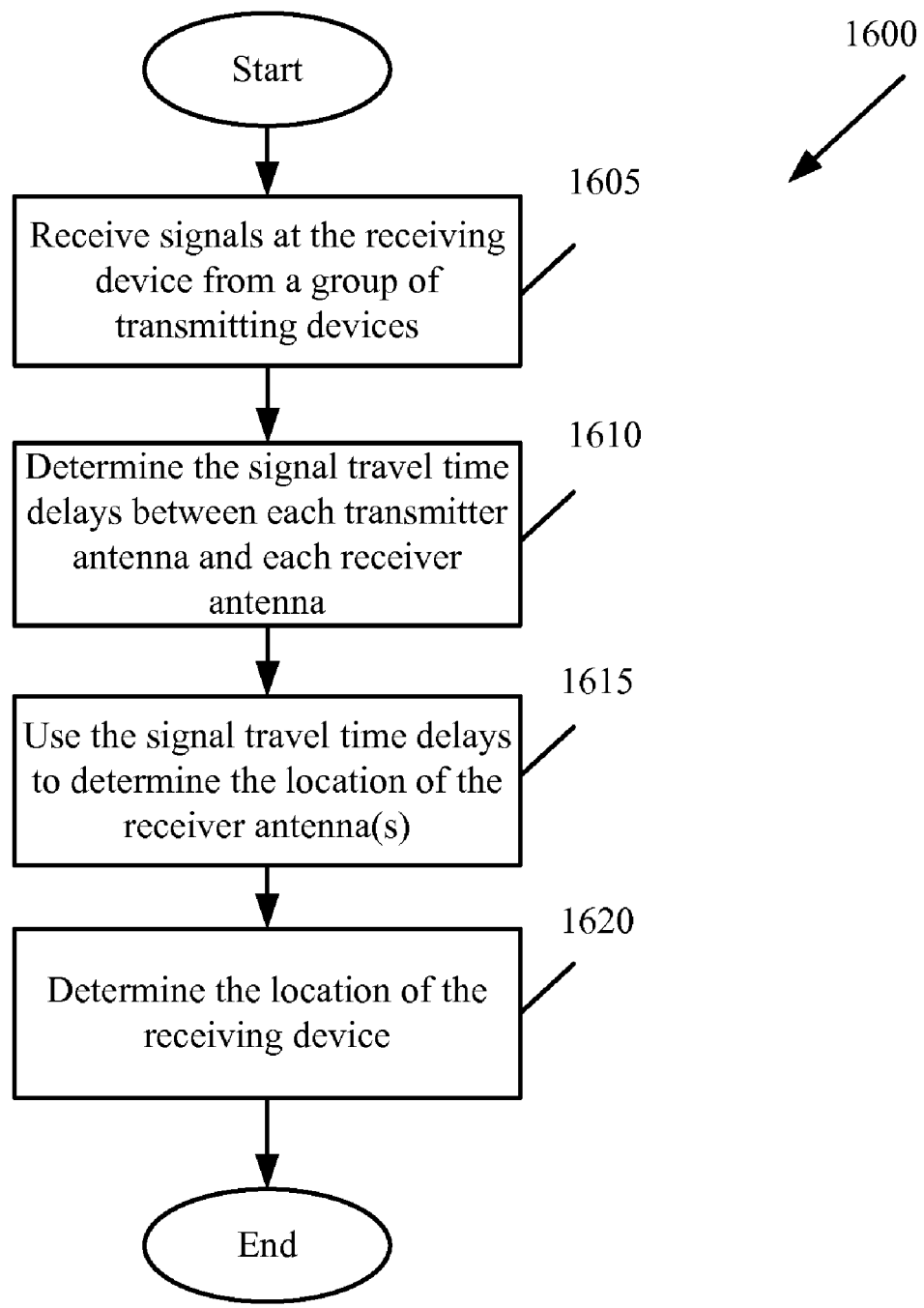
FIG. 16 conceptually illustrates a process that uses devices with multiple antennas to determine the location of a mobile device.

In some alternative embodiments, when the locations of the access points are known (for instance from a scanning vehicle like in FIG. 21 or from surveys) then that information together with transmissions between the access points is used to synchronize the clocks of the access points. In other embodiments, when the positions of the access points are known (for example from a scanning vehicle like in FIG. 21) and the mobile and/or the access points have more than one antenna then it is possible to locate the mobile without having to synchronize the access points (FIGS. 14, 15, and 16).

In yet other alternative embodiments a mobile device that has multiple radio types (e.g. Bluetooth®, WLAN, cellular (e.g., 2G, 3G, 4G), WiMax), HD Radio™, UWB, ZigBee, RFID, and 60 GHz standards) communicates with access points that support one or more of its radio types. The location of the mobile device can then be calculated independently with a number of radio types. A final location of the mobile device is then calculated by weighted averaging of each radio type location. The weights can be equal, or they can vary based on criterion such as signal strength of each radio type or reliability of each radio, etc. It should be noted that that if a device has multiple radios then its antenna (or antennas if it has more than one antenna as in MIMO systems) can receive radio information simultaneously from different radio types. However, the baseband of the receiver of each radio type can use different techniques (such as correlation, frequency or time domain filtering, or frequency hopping) to eliminate unwanted signals. For instance, a Bluetooth® receiver can use a correlation that detects Bluetooth® signals but eliminates WLAN or other signals, and likewise a WLAN receiver can use correlation that detects WLAN signals but eliminates Bluetooth or other signals.

One of ordinary skill in the art will recognize that process 800 is a conceptual representation of the operations used to determine the location of a device. The specific operations of process 800 may not be performed in the exact order shown and described. The specific operations may not be performed in one continuous series of operations, and different specific operations may be performed in different embodiments. Furthermore, the process could be implemented using several sub-processes, or as part of a larger macro process.

A. Synchronizing Access Point Clocks

Figure 9:
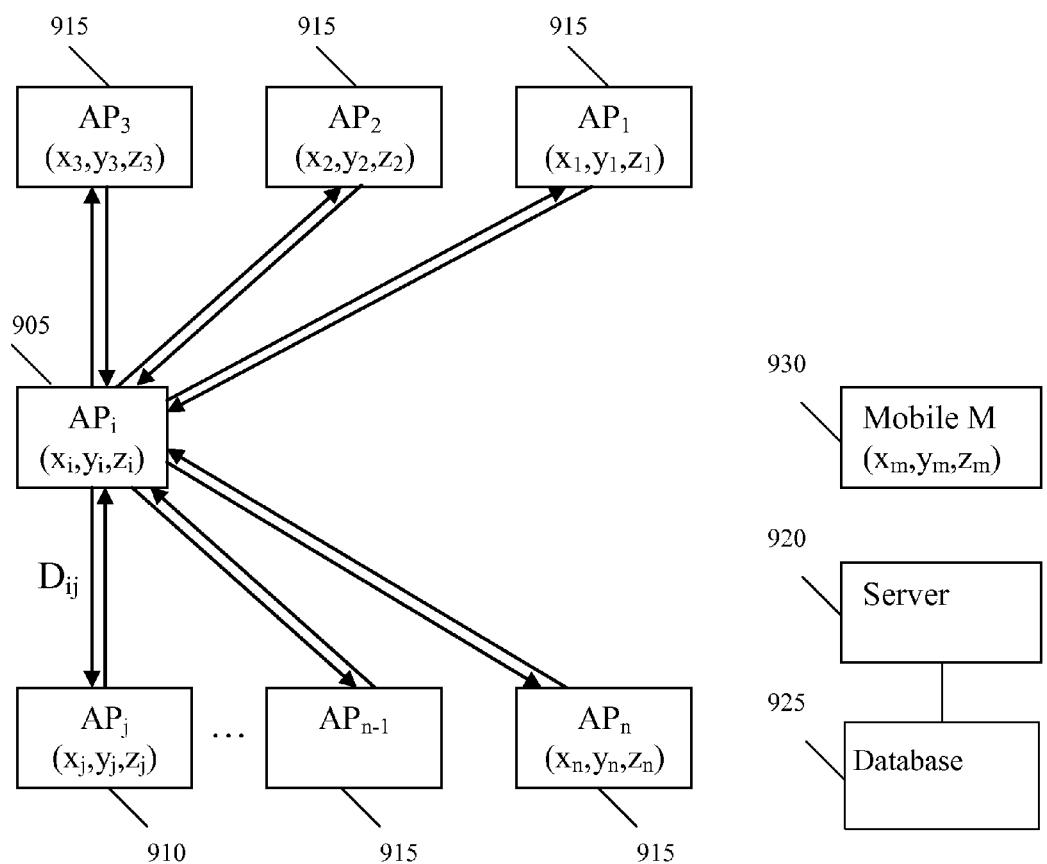
FIG. 9 conceptually illustrates an embodiment in which a group of access points synchronize their clocks together.

FIG. 9 illustrates an embodiment in which a group of access points 905-915 synchronize their clocks together. Also shown, are a server 920, a database 925, and a mobile device 930. The server illustrates in this and the other following figures signify the option that any discussed calculation can be performed on the server rather than one of the access points. The database is shown to signify that information such as access point locations and MAC IDs can be stored in the database. The mobile device is shown to show the device for which a location is being identified by some embodiments. In the example of FIG. 9, access point AP, 905 acts as a master access point with respect to the other access points in order to synchronize their clocks. Synchronization of access points $AP_i$ 905 and $AP_j$ 910 (that are separated by a distance $D_{ij}$) is described as an example. In this example the clocks of these two access points are not synchronized such that the frame boundary of $AP_j$ is off by $t_{ijoffset}$ seconds with respect to the master access point, $AP_i$. The travel time delay of a signal between these access points, $T_{ij}$ or $T_{ji}$, in seconds is expressed in the following expression:

$$T_{ij}=T_{ji}=D_{ij}/C$$

Where $D_{ij}$ is the distance between these two access points; C is the speed of light (i.e., $3\times10^8$ miles/s); $T_{ij}$ denotes the delay when $AP_i$ is the transmitter and $AP_j$ is the receiver; and $T_{ji}$ denotes the delay when $AP_j$ is the transmitter and $AP_i$ the is receiver.

However, as shown in FIG. 5, the time measurement method introduces a constant offset of $(16\mu s+t_{FEdelay})$. Similar to the receivers described by reference to FIGS. 3 and 6, an access point's front-end RF includes components such as one or more antenna, LNA, filter, ADC, etc. which introduce an additional delay, $t_{FEdelay}$. Also, because the clocks of the two access points are not synchronized and are offset by $t_{ijoffset}$ when master access point AP, 905 sends a packet, access point $AP_j$ 910 receives the packet at time $(T_{ij}+16 \mu s+t_{FEdelay}-t_{ijoffset})$ with respect to its frame boundary. Likewise, when $AP_j$ transmits a packet master access point $AP_i$ receives the packet at time $(Tji+16 \mu s+t_{FEdelay}+t_{ijoffset}+t_{ijoffset})$ with respect to its frame boundary since $t_{ijoffset}=t_{jioffset}$. It is assumed that the delay introduced by the front-end of the two access point is the same since they are similar hardware or any differences are negligible (for example, in a 10 MHz RF system the mean delay value for the filter is 20 ns, the delay for the LNA is negligible, and the ADC introduces a delay of one clock corresponding to 1/fs which for a WLAN system at 160 MHz is 6.25 ns). The short and long preamble symbols ensure that the ADCs of both access points are at the same sampling rate. Thus, the difference between these two transmissions is expressed in the following expression:

$$(T_{ij}+16 \mu s+t_{FEdelay}+t_{ijoffset})-(T_{ji}+16 \mu s+t_{FEdelay}-t_{ijoffset})=2*t_{ijoffset}$$

Figure 10:
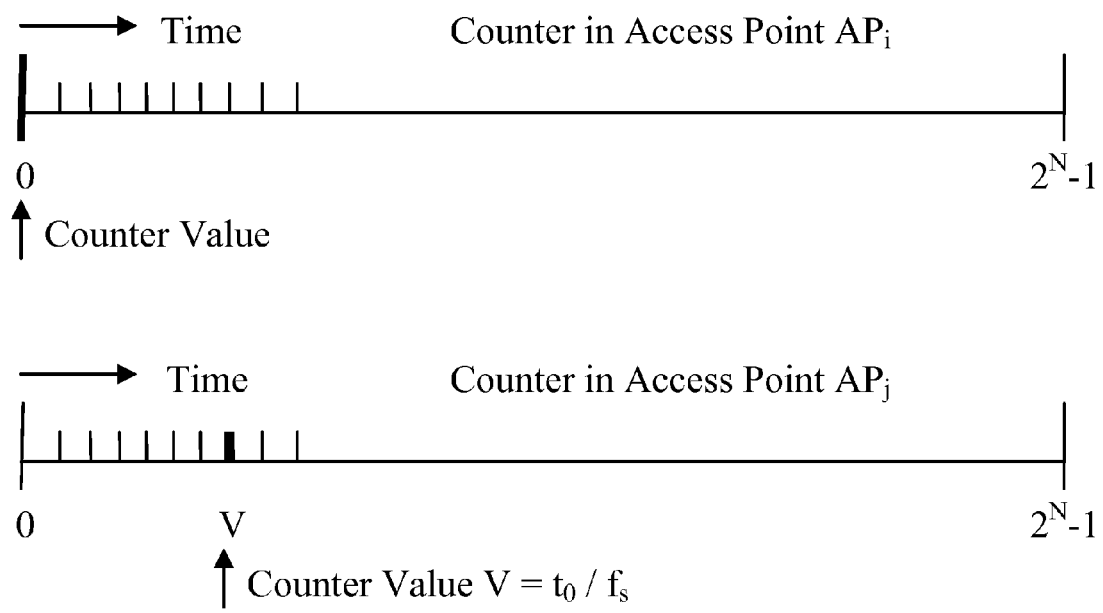
FIG. 10 illustrates values of register counters of two access points in some embodiments.

This difference represents twice the offset $t_{ijoffset}$, and access point $AP_j$ can use this information to correct for $t_{ijoffset}$ and synchronize its clock with master access point $AP_i$. The transmission has to be carried out both ways so that the difference between the two eliminates the constants and leaves only $t_{ijoffset}$. One method to synchronize the clocks is to use register counters. This is illustrated in FIG. 10, where at a given time instance the register counter of $AP_j$ has value V while the register counter of $AP_i$ has value 0. A transmitter's counter value at transmission time can be stored in the SIGNAL symbol and retrieved at the receiver and compared with the receiver's counter value at reception in order to measure time delays. Since the ADC sampling rate is $f_s$ then $t_{ijoffset}$ is as expressed in the following expression:

$$t_{ijoffset}=(V/f_s)$$

The process of synchronizing involves either changing the register of $AP_j$ to have the same value as the register of $AP_i$, or storing the difference between the two register values in memory so that future time measurements can be corrected. After the clocks are synchronized the time measurements are only offset by a constant, $(16 \mu s+t_{FEdelay})$, which may be calibrated and compensated for. For example, the distance between two access points, $D_{ij}$, can be physically measured or calculated if their position is known. After the clock registers of the two access points have been synchronized the measured travel time between the two is $(T_{ij}+16 \mu s+t_{FEdelay})$, where $T_{ij}=D_{ij}/C$. Hence, the constant $t_{FEdelay}$, can be calculated and compensated for future time measurements. If the constant $t_{FEdelay}$ is not calculated then an extra variable is introduced into the equations, which means one more access point is required to solve the equations.

This process is repeated with other access points so that all the access points are synchronized. Note that the master access point only needs to make one transmission to all the non-synchronized access points and each of the non-synchronized access points receive that transmission at times that are proportional to their distance separation from the master access point, their clock offsets and a constant. The transmission from each of the non-synchronized access points to the master access point, however, needs to be performed at different times. The sequence order of transmissions from AP1, AP2, ..., AP$_n$ to AP$_i$ can be signaled inside the data field of the packets sent from the master AP$_i$. Standard TCP networking mechanisms such as Request to Send (RTS) and Clear to Send (CTS) can be used to avoid contention.

Once an access point is synchronized with the initial master access point, the synchronized access point can serve as a master access point to synchronize other access points within its range. This approach is useful since the initial master access point may not be able to reach all access points because of range limitations. In an alternative embodiment, instead of synchronizing the clocks, the time offset information is stored somewhere (such as in some or all of the access points) so that the time offset information is used to adjust the measured times of the non-synchronized access points. The time offset information can then be transmitted in the data portion of the packet.

When the location of the access points are known, the synchronization of the clocks of the access points becomes simpler with time calibration measurements since the distances $D_{ij}$ between the access points are known. Hence equation $T_{ij}=T_{ji}=D_{ij}/C$ can be used to calculate the transit time delays $T_{ij}$ (or $T_{ji}$) and compare them to the measured delays. The measured delay with AP$_i$ transmitting and AP$_j$ receiving, $T_{measured-ij}$, is expressed in the following expression:

$$T_{measured-ij}=T_{ij}+16\ \mu s+t_{FEdelay}+t_{ijoffset}$$

Also, the measured delay with APj transmitting and APi receiving, $T_{measured-ji}$, is expressed in the following expression:

$$T_{measured-ji}=T_{ji}+16\ \mu s+t_{FEdelay}-t_{ijoffset}$$

Hence the two calibration equations above can be used to find the two unknown variables, $t_{ijoffset}$ and $t_{FEdelay}$.

B. Determining the Location of Access Points

Figure 11:
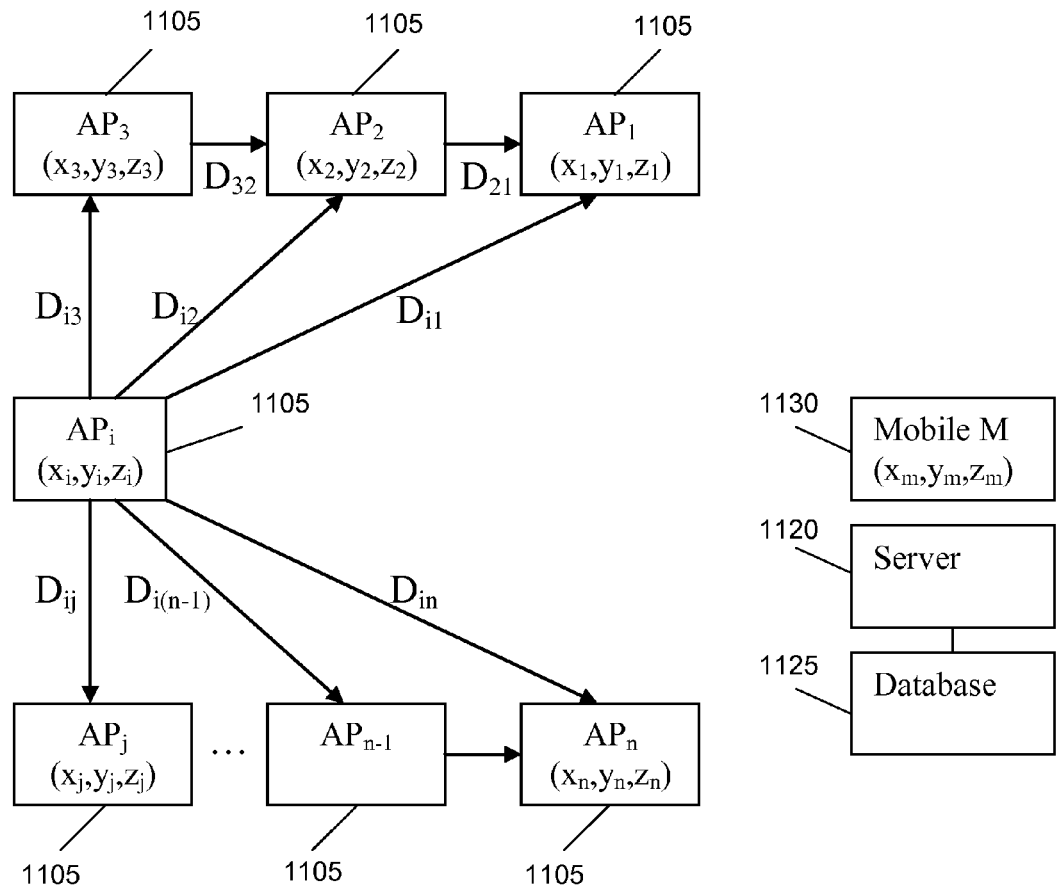
FIG. 11 conceptually illustrates a group of access points for which positions are calculated after their clocks have been synchronized in some embodiments.

In many indoor situations, such as malls and buildings, the locations of access points is fixed and known. However, the proposed method is general enough to handle situations where the locations of access points are unknown. FIG. 11 conceptually illustrates the step where the positions of access points are calculated after their clocks have been synchronized. FIG. 11 shows a group of n access points 1105 where their locations are unknown. The distance between access points i and j is shown as $D_{ij}$. As described below, wireless transmission and reception of packets between the access points and their channel delay can be used to calculate the distances $D_{ij}$. Each access point 1105 has three unknown variables (x,y,z) and one of the access points can be at the coordinate system (0,0,0). In addition, there is one more unknown variable, $t_{FEdelay}$. The number of unknowns are, therefore, 3*(n−1)+1.

When all access points have enough range to see other access points, there are n*(n−1)/2 access point separation distances that can be calculated. This means that if there are seven access points that can reach each other, then enough information can be gathered to find the location of the other access points (when n is 7, the number distances, i.e., n*(n−1)/2 will be more than the number of unknowns, i.e., 3*(n−1)+1). Also, when $t_{FEdelay}$ has been calculated through calibration measurements, there is one less unknown variable and six access points are sufficient to find the location of the access points. In fixed installation situations, such as malls, where the access points do not move around it is possible to place additional temporary access points in between the regular ones such that n is large enough to find the coordinates of the regular access points. After this calibration step is carried out, the temporary access points can be removed. The locations of the access points and their identifiers such as Media Access Control IDs (MAC addresses) can be transmitted (e.g., to a server 1120) in the DATA and SIGNAL fields, respectively, and stored in a database 1125. This database can be separate or it can physically reside on a server 1120 or on an access point 1105. It can also be downloaded onto the mobile device 1130 when necessary.

C. Determining the Location of a Mobile Device using Known Locations of a Group of Access Points FIG. 12 conceptually illustrates using a number of access points to locate the position of a mobile device. The access points 1205 have either synchronized their clocks (using the method of FIG. 9) or their time offsets with reference to the master access point is known such that their measured times can be post-processed to be effectively synchronized. In some embodiments the mobile device 1210 performs the location calculations. In other embodiments the mobile device 1210 transmits the information to an access point or a server to perform the calculations. As described by reference to FIG. 11, some embodiments store the location of the access points in a database 1125. When the mobile device 1210 is doing the location calculations itself, the location of the access points 1205 and their MAC addresses need to be retrieved from the database 1125 and sent as messages to the mobile device 1210. These messages could be sent in WiFi, Bluetooth® or other wireless or wired transmission methods. For instance, with WiFi this information could be sent in the data part after the SIGNAL field of the frame.

The master access point can transmit the schedule of which access point transmits to the mobile first, second, etc to all the access points. For instance, the data portion of the packet can include order and identification of each access point. Each access point then transmits to the mobile device in its time slot and the mobile device notes the estimated delay using the methodology of FIG. 3, where the receiver is the mobile. In this formulation the general situation is considered where the clock of the mobile is not synchronized to the access points. As is described below, however, it is possible to calibrate the mobile device 1210 whereby the problem is simplified further.

The location of the mobile device can be expressed in the following expression:

$$((T_{measured-im}-16\ \mu s-t_{FEdelay}-t_{mFEdelay}-t_{moffset})\cdot C)^2=d_i^2$$

where the position of the mobile device is $(x_m,y_m,z_m)$, mobile device clock time offset with respect to the clock of the access points is $t_{moffset}$, the mobile device's front-end RF components introduce an additional delay, $t_{mFEdelay}$, on top of the front-end delay $t_{FEdelay}$ introduced by the access points, the position of access point i is $(x_i,y_i,z_i)$, the distance between the mobile device and access point i is $d_i$, and the mobile device's estimation of the travel time delay between access point i and the mobile device is $T_{measured-im}$.

After inserting the formula for $d_i^2$, the location of the mobile device is expressed in the following equation (Eqn. 1):

$$((T_{measured-im}-16\ \mu s-t_{FEdelay}-t_{mFEdelay}-t_{moffset})\cdot C)^2= (x_m-x_i)^2+(y_m-y_i)^2+(z_m-z_i)^2 \text{ where } i=1, 2, \ldots, n. \quad \text{(Eqn. 1)}$$

Since $t_{FEdelay}$, $t_{mFEdelay}$ and $t_{moffset}$ are constants they can be treated as one unknown constant. There are therefore four unknowns, $(t_{FEdelay}+t_{mFEdelay}+t_{moffset})$, and $(x_m\ y_m\ z_m)$. Thus, at least four access points are needed for a location finding algorithm to use equation (Eqn. 1) and find the location of the mobile, $(x_m\ y_m\ z_m)$. It should be noted that equation (Eqn. 1) directly calculates the location of the mobile device without the need to calculate the distance between the mobile device and any of the access points. This is in contrast with techniques that require calculating the distance between the mobile device and the access points and use, e.g., triangulation to determine the location of the mobile device. The disclosed location finding algorithm can reside and run on the mobile device 1210, an access point 1205, or a network server 1120. In practice, equation (Eqn. 1) will not have an exact solution because of the presence of noise. However, techniques such as least squares can be used to find the best solution that minimizes a particular metric. An example of such a technique is described in "Simulation of Urban Vehicle-Monitoring Systems", G. Turin, W. Jewell, and T. L. Johnston, IEEE Transactions on Vehicular Technology, vol. VT-21, No. 1, February 1972, pp. 9-16 which is hereby incorporated by reference.

Figure 12:
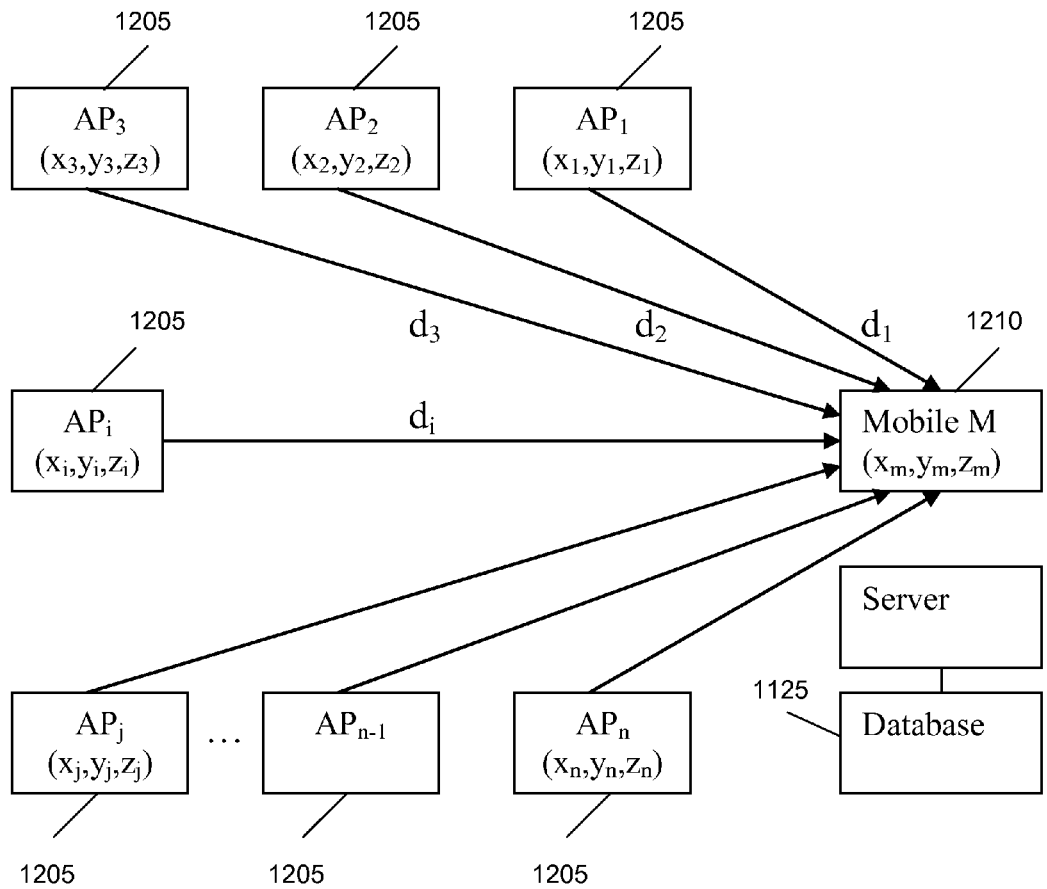
FIG. 12 conceptually illustrates using a group of access points to determine the position of a mobile device in some embodiments.

More access points will provide averaging and more accurate results. In some embodiments a mobile station whose position is known and updated is also used as an access point to locate the position of other mobile stations. When there are more mobile devices present in FIG. 12 and they also need to calculate their positions they would also listen to the same transmissions. So there is no need for each access point to make separate transmissions for each mobile device. FIG. 12 illustrates an example of the embodiments where the access points transmit signals to the mobile device. In other embodiments, the mobile device transmits to the access points and each access point estimates the travel time delay between the mobile device and the access point. These embodiments provide a scheduling mechanism to ensure that when there are several mobile devices present, only one mobile device transmits at time. For instance, in some embodiments, the master access point conveys this information in the data portion of the wireless packets the master access points sends to the mobile devices.

Some embodiments provide a hybrid where some access points transmit and the mobile device receives, while the mobile device transmits to other access points. The latter is important in some systems where transmit and receive frequencies are different to achieve frequency diversity. For instance, some cellular systems transmit at 1 GHz and receive at 1.1 GHz. Switching the role of transmitter and receiver therefore provides more data samples and equations to solve. Also some systems such as WLAN can operate at different frequencies. For example, WLAN 802.11a and 802.11g use two different frequencies and using both frequencies provides more data for processing and getting a more accurate location. Another way to improve location accuracy is to use several wireless standards. For instance, when an access point and a mobile station both have UWB, 60 GHz, and WLAN connectivity, data may be obtained from all these standards and processed to get a more accurate location value.

D. Filtering and Smoothing the Calculated Location of a Mobile Device

FIG. 8 also shows an optional step (at 835) to filter and smooth the calculated location of the mobile based on previous positions. The mobile device can calculate its position at various times instances. In some embodiments, the mobile device uses two or more position calculations and the elapsed time to calculate its velocity. In some embodiments, velocity information is also computed from signal amplitude information and Doppler effects. Previous calculated positions and velocity information are used to filter and smooth the current calculated position. This smoothing mechanism can further reduce positioning errors that may be caused by multipath propagation or other issues. Some embodiments use simple filtering algorithms like linear 1-tap filters while other embodiments use more complex algorithms such as Kalman filtering. Some embodiments use prior positions and velocity information directly to solve equation (Eqn. 1) (as opposed to first solving equation (Eqn. 1) and then smoothing the result).

E. Calculating Time Delays between the Mobile Device and Access Points

In some embodiments, mobile devices do not keep an absolute time reference. Instead, every time they exchange packets with access points they synchronize themselves to the access points. In order to find the location of the mobile device with preamble correlation delays the mobile device needs to have a counter that represents time, as shown in FIG. 3. The counter can then be used to calculate delays between the mobile and access points. Thus, for each access point that the mobile plans to use for finding its location, the mobile needs to store in firmware/software the corresponding counter. Likewise, each access point must also have its own counter to keep track of time. For example, after all the access points are synchronized all their counters have the same value. The counter can reset after a specified time in order to reduce hardware complexity. How often the counter is going to reset is an implementation parameter. Thus in these embodiments, the preamble correlation method uses existing wireless standards, but requires firmware update and the addition of counters to the hardware of the access points and the mobile receiver.

The benefits of improved positioning and associated services will provide a compelling reason for these small hardware and software changes. An alternative is to produce low-cost access points that are dedicated to positioning applications and do not perform data communication functionality. For instance, one of the access points will act as the master access point and is connected to the Internet but the other access points will be simpler devices with no Internet access, less memory and simpler basebands. This invention can also use the RSSI transition time instead of the preamble correlation method to eliminate the need for register counters for time measurements.

F. Calibrating the Mobile Device

Figure 13:
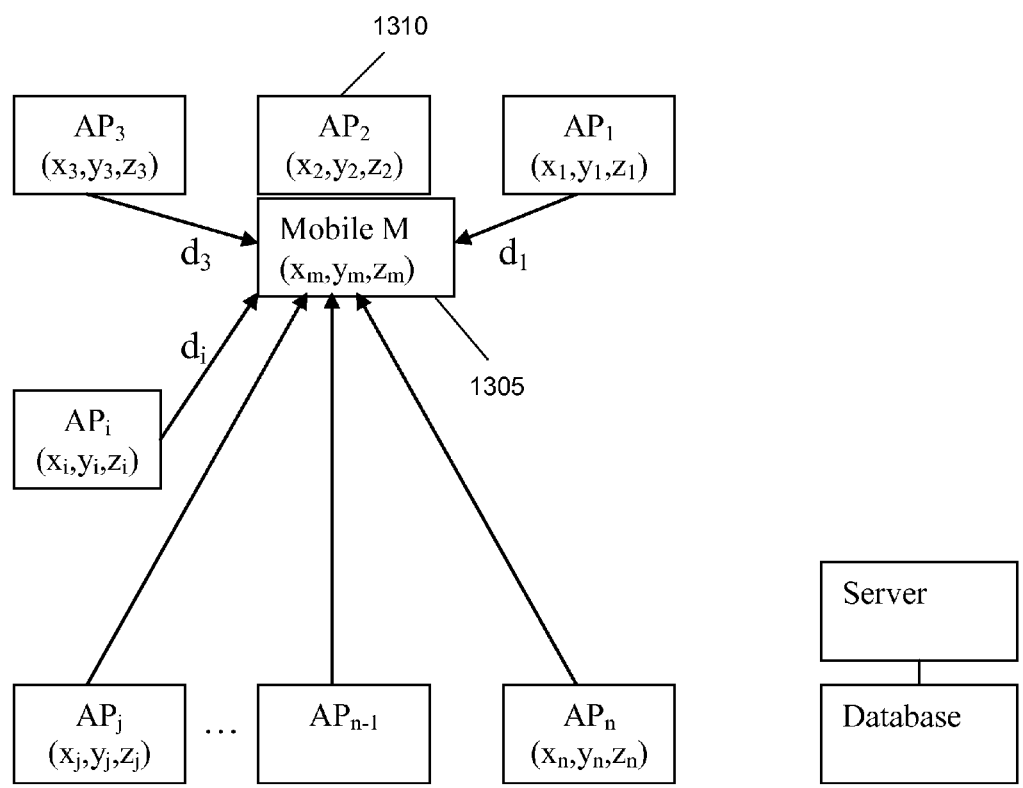
FIG. 13 conceptually illustrates a mobile device being calibrated in some embodiments.

FIG. 13 conceptually illustrates the optional step of calibrating the mobile device. Recall that the access points are synchronized and their locations are known. As shown, the mobile device 1305 is placed at the location of one of the access points (AP$_2$ 1310 in FIG. 13) and communicates with the access point 1310 using methods such as Near-Field Communication (NFC), Bluetooth®, Wi-Fi, etc. The location of the mobile device 1305 then becomes that of the access point $(x_2, y_2, z_2)$. Referring back to equation (Eqn. 1), it is possible to calculate the combined constant $(t_{FEdelay}+t_{mFEdelay}+t_{moffset})$. For instance, in FIG. 13 the measured travel time delays, $T_{measmed-im}$, between the mobile and each access point i (where i=1, 3, 4, . . . , n, since the mobile device 1305 is at the location of AP$_2$ 1310 in this example) are used to calculate $(t_{FEdelay}+t_{mFEdelay}+t_{moffset})$. Referring back to equation (Eqn. 1), this method reduces the number of variables to three, thus requiring one fewer access point to calculate the location of the mobile (a minimum of 3 access points instead of 4). Placing the mobile at the location of one of the access points might not be desirable for some applications, however. Thus, this calibration step of the mobile is only an option and not a requirement.

In another embodiment there are variations in FIG. 8, where GPS signals are present and GPS-enabled mobile devices with wireless radios (e.g. devices such as people's cell phones or tags) are used to locate a mobile device. The latter mobile device that does not have GPS (or is not receiving GPS signals), but does have wireless radios (such as Bluetooth®, WLAN, cellular (e.g., 2G, 3G, 4G), WiMax, HD Radio™, UWB, RFID, ZigBee, and 60 GHz standards). The GPS-enabled devices that act as access points can then use the GPS reference signal to synchronize their clocks and use GPS to obtain their positions. These are functionally the first two blocks in FIG. 8. The rest of FIG. 8 is the same with the GPS-enabled mobile devices acting as the access points, where one of them is a master. These GPS-enabled mobile devices then use their wireless radios to measure the travel time to the mobile that needs its location and transmit that information and their own positions to the master. The master then calculates the position of the mobile and sends it to the mobile.

F. Use of Devices with Multiple Antennas

The discussion so far has assumed that the access point and the mobile receiver have only one antenna. MIMO systems (multiple-input, multiple-output) provide more data measurements and hence can improve the accuracy of the system and reduce system complexity by requiring fewer access points and eliminating the need for time synchronization. If an access point has more than one antenna then each antenna can transmit separately and the receiver does channel estimation on each separately. This provides more data for averaging since each transmission experiences a different channel profile. Likewise, if the mobile has more than one antenna then each antenna receives independently and because the noise on each antenna is almost uncorrelated the estimated delay will be more robust. Thus, increasing the number of antenna on the transmitting access points and receiving mobiles improves the accuracy by providing more averaging and reducing the effects of multipath. Furthermore, it is possible to use just those antennas with the highest performance, lowest bit error rates, and better line of sight.

Figure 21:
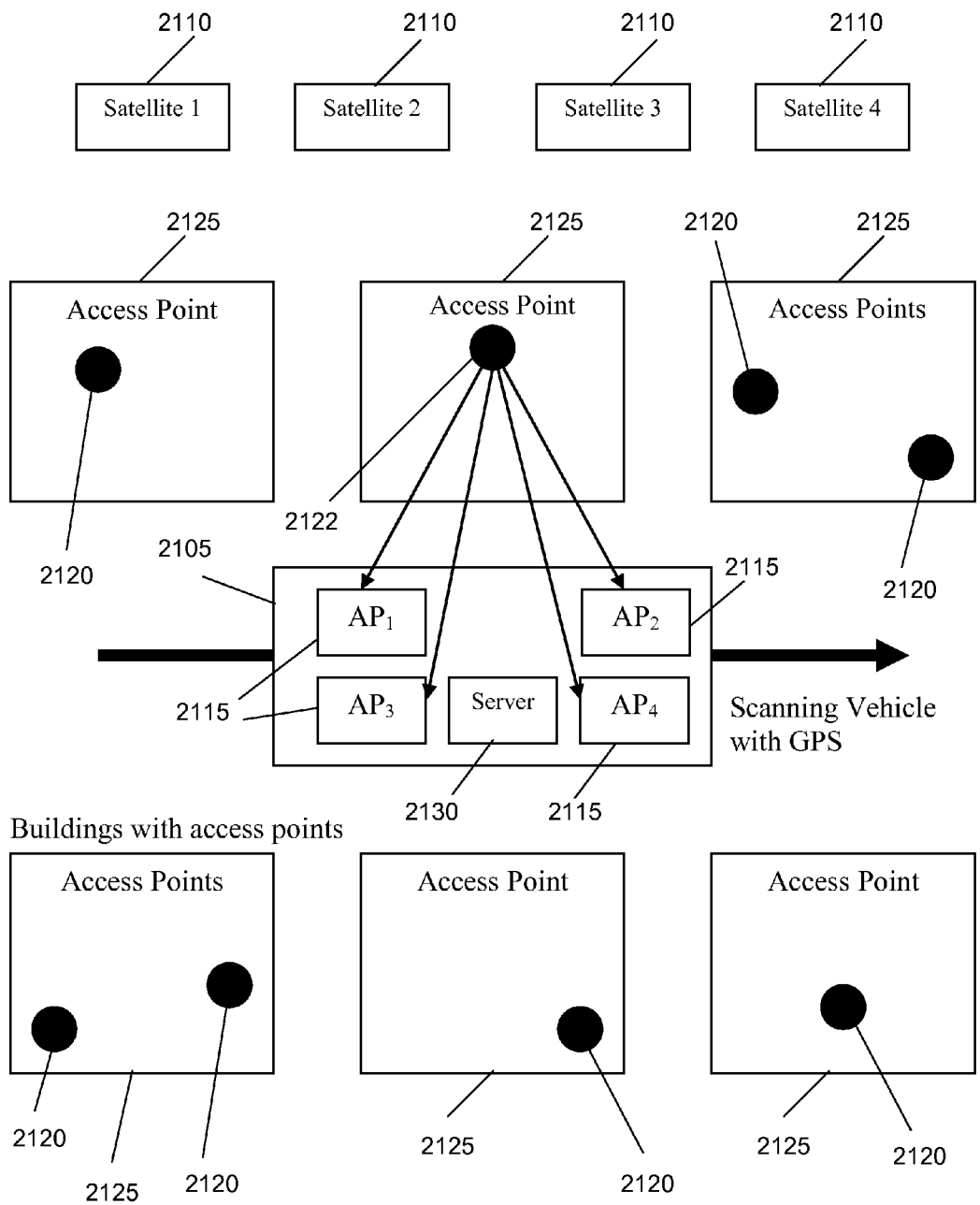
FIG. 21 conceptually illustrates scanning vehicle that uses a commercial grade GPS to communicate with satellites in order to calculate its own position in some embodiments.

As described below, the use of multiple antenna systems is important since with multiple antenna there is no need to synchronize the access points or calibrate the mobile, as long as the position of a number of access points are known. In one embodiment, the position of the access points are mapped out and stored in a database (FIG. 21). Then, a multiple antenna mobile device can use the information in the database and the signals the mobile device receives from the access points to locate itself without requiring the clocks of the access points to be synchronized.

FIG. 14 conceptually illustrates an example where the mobile device 1405 receiver has more than one antenna 1410-1415. As shown in FIG. 14, mobile device 1405 has two receiver antennas. Consider the case where the location of the access points 1420 are known but the access points are not synchronized with each other and the offset of $AP_j$ relative to a master $AP_i$ is $t_{joffset}$. Suppose that the two antennas 1410-1415 are separated by a distance d and are located at $(x_{m1}, y_{m1}, z_{m1})$ and $(x_{m2}, y_{m2}, z_{m2})$. Then, the two equations for the transmission from $AP_j$ to each of the antennas are expressed in the following equations (Eqn. 2) and (Eqn. 3):

$$((T_{measured-jm1} - t_{joffset} - 16 \mu s - t_{FEdelay} - t_{mFEdelay} - t_{moffset}) \cdot C)^2 = (x_{m1} - x_j)^2 + (y_{m1} - y_j)^2 + (z_{m1} - z_j)^2 \quad \text{(Eqn. 2)}$$

$$((T_{measured-jm2} - t_{joffset} - 16 \mu s - t_{FEdelay} - t_{mFEdelay} - t_{moffset}) \cdot C)^2 = (x_{m2} - x_j)^2 + (y_{m2} - y_j)^2 + (z_{m2} - z_j)^2 \quad \text{(Eqn. 3)}$$

The number of unknown variables is $(6+n-1+1+1)=(7+n)$, where n is the number of access points. Six of the unknowns are for the two antenna coordinates $(x_{m1}, y_{m1}, z_{m1})$ and $(x_{m2}, y_{m2}, z_{m2})$, n−1 unknowns are for the access point time offsets $t_{joffset}$ relative to a master access point, one unknown is for the mobile's time offset $t_{moffset}$ and one unknown is for the constant $(t_{FEdelay}+t_{mFEdelay})$. There are 2*n equations since each antenna measures a time of arrival delay from each of the n access points. In order to be able to find a solution the number of equations must be greater than or equal to the number of unknowns:

$$2n \geq 7+n$$

i.e. $n \geq 7$. If the separation distance d between the antennas is known then an extra equation is also provided by geometry:

$$(x_{m1}-x_{m2})^2 + (y_{m1}-y_{m2})^2 + (z_{m1}-z_{m2})^2 = d^2$$

This gives $n \geq 6$.

The above results are important since as long as there are seven access points (or six if the antenna separation distance is known) with known locations, there is no need to synchronize the access points (FIG. 21, below, illustrates one method of using time of arrival delays to build a database of access point locations). This makes the disclosed method applicable to outdoor positioning settings where GPS signals are weak such as urban canyons, tunnels, and locations that are surrounded by tall buildings. FIG. 14 can also be modified where the receiver has more than two antennas and/or where one or more of the access points have more than one antenna.

The latter is shown in FIG. 15, where each of the access points 1520 have more than one transmitter antennas 1510-1515 and the mobile device 1505 has one antenna. Again, if the position of the access points is known there is no need to synchronize the access points. In this case the number of equations is 2n as before but the number of variables is (4+n) since the mobile only has one antenna with 3 unknown position variables. This gives $n \geq 4$. The access points are larger in size as compared to a mobile phone and can therefore have a greater separation distance between their antennas. This greater separation distance makes the resulting data from the antennas more useful since there is less correlation. This is even more important the closer the mobile is to the access point since the paths from the two access point antennas to the mobile device are more separated.

FIG. 16 conceptually illustrates a process 1600 that uses devices with multiple antennas to determine the location of a mobile device. In some embodiments, any of the devices in FIGS. 14 and 15 utilize process 1600 to determine their location. Furthermore, in some embodiments, transmitting devices are access points or mobile devices with known locations. In some embodiments, the receiving device is a mobile device or an access point with unknown location. As shown, process 1600 receives (at 1605) signals from several transmitting devices at a receiving device. In some embodiments, as described by reference to FIG. 14, the receiver has multiple antennas. In other embodiments, as described by reference to FIG. 15, one or more of the transmitters have multiple antennas.

In some embodiment, the mobile device has multiple radio types (e.g. Bluetooth®, WLAN, cellular (e.g., 2G, 3G, 4G), WiMax), HD Radio™, UWB, ZigBee, RFID, and 60 GHz standards) and communicates with access points that support one or more of the mobile device's radio types. In these embodiments, the location of the mobile device is calculated independently with a number of radio types. A final location of the mobile device is then calculated by weighted averaging of each radio type location. The weights can be equal, or they can vary based on criterion such as signal strength of each radio type or reliability of each radio, etc. As indicated above, when a device has multiple radios, its antenna (or antennas if it has more than one antenna as in MIMO systems) can receive radio information simultaneously from different radio types. However, the baseband of the receiver of each radio type can use different techniques (such as correlation, frequency or time domain filtering, or frequency hopping) to eliminate unwanted signals. For instance, a Bluetooth® receiver can use a correlation that detects Bluetooth® signals but eliminates WLAN or other signals, and likewise a WLAN receiver can use correlation that detects WLAN signals but eliminates Bluetooth or other signals.

As shown, the process determines (at 1610) the signal travel time delays between each of the transmitter antennas and each of the receiver antennas. Different embodiments use different techniques described above to measure the signal travel time delay between a transmitter and a receiver. Next, the process uses (at 1615) the signal travel time delays to determine the location (e.g., the coordinates) of each of the receiver antennas. Some embodiments use one equation such as (Eqn. 2) or (Eqn. 3) for each pair of transmitter and receiver antennas. Details of determining the coordinates of the receiver antennas are described above by reference to FIGS. 14 and 15.

Next, the process determines (at 1620) the location of the receiving device. The process then end. Some embodiments use a weighted sum or an average of each receiver antennas to determine the location of the mobile device. The baseband of some MIMO systems delay shift the signals from separate antennas in order to align the data. Some embodiments use this delay shift for positioning. For instance, for a two antenna system the delay shift represents the difference in time of arrival for the two antennas which corresponds to the difference in distance for the two antennas. A MIMO system also performs better in fading or multipath situations. For instance, when the powers of two antennas is very different, the system can use the high power antenna or give it more weight in the calculations since the lower power antenna is experiencing more fading or multipath. When the mobile wireless device has more than one antenna (where each antenna radiation pattern covers a sector with a different range of angles), angle of arrival measurements can also be used to provide more equations and restrict the solution further.

One of ordinary skill in the art will recognize that process #2100 is a conceptual representation of the operations used to determine the location of a device. The specific operations of process #2100 may not be performed in the exact order shown and described. The specific operations may not be performed in one continuous series of operations, and different specific operations may be performed in different embodiments. Furthermore, the process could be implemented using several sub-processes, or as part of a larger macro process.

There are several parameters that affect the accuracy of the system. The accuracy of this positioning system increases with (1) increase of the signal sampling rate (e.g. 4 MHz for Bluetooth®, 20 MHz for 3G cellular, 160 MHz for WiFi, 4 GHz for 60 GHz standard), (2) number of access points and optimized distribution of access points, (3) number of access point antenna, (4) number of mobile receiver's antenna, (5) frequency diversity, (6) use of multiple standards, and (7) moving speed of the receiver.

Increasing the sampling rate up to a certain limit improves the time delay estimate because of improved correlation. Increasing the number of access points improves the accuracy by providing more averaging and reducing the effects of multipath. An optimized distribution of access points can also improve accuracy. For instance, access points should be uniformly distributed in a building so that a mobile can typically see different access points all around itself. An example of a sub-optimal positioning of access points is a case where all the access points are clustered close together on one side and a mobile only sees access points on one side of it and not the other side. Increasing the number of antenna on the transmitting access points and receiving mobiles improves the accuracy by providing more averaging and reducing the effects of multipath. Frequency diversity, such as using the 5 GHz band and the 2 GHz band for WLAN, also provides better averaging and results in a more accurate estimated location. The use of multiple standards also improves accuracy. For instance, when an access point and a mobile station both have UWB, 60 GHz, and WLAN connectivity, data may be obtained from all these standards and processed to get a more accurate location value.

When the mobile whose position needs to be estimated is not stationary and is instead traveling at high speeds, the coverage area of the access points becomes limited and causes hand-off issues between access points. These are not problems for applications such as a person walking inside buildings (or outdoors for that matter) since the speeds are not high enough. At high speeds (such as fast outdoor driving applications), however, access point hand-off and coverage issues would compromise the utility of the system.

The actual accuracy of the estimated position is only affected once speeds get very high. This is because the method uses the preamble and does not decode the rest of the data packets. Hence, channel tracking is not an issue. In order for the method to come up with an accurate position estimate the phase shift from one symbol to the next has to be negligible. If $\Delta f$ is the error in frequency compared to the reference frequency, and coherent correlation length L is 6.4 µs (length of the long preamble), then $\Delta f * L$ is the amount of phase shift in the symbol of length L. Since the phase shift from one symbol to the next is needed to be negligible then $\Delta f * \Delta f * L << 0.5$. As an approximation << is replaced with 0.01. This gives $\Delta f = 0.005/6.4$ µs. But $\Delta f = v f / C$, where v is the speed of the mobile, C is the speed of light, and f is the frequency of the wireless system. For a 2.4 GHz WLAN system this gives v=350 Km/h. Therefore, as long as the speed of the mobile is less than 350 Km/h then phase shift errors are negligible.

The methods described in the above embodiments are general and can also be applied to outdoor settings where GPS signals are weak such as urban canyons, tunnels, and locations that are surrounded by tall buildings. Range transmission is approximately proportional to the inverse of the frequency squared. For example, wireless standards can use lower frequencies, thereby giving greater range and increasing the coverage for outdoor applications.

The embodiments disclosed above overcome several shortcomings of previous systems that determine the position of a device. For instance, the GPS-based and infrared-based systems require direct line of sight. Furthermore, GPS-based systems do not work in an indoor environment. Similarly, RF-based systems provide poor indoor positioning accuracy because RF signal amplitude is greatly affected by metal objects, reflective surfaces, multipath, dead-spots, noise, and interference. Other systems were proposed in the past that required dedicated and often expensive equipments. Also, the previous cellular tower triangulation methods provide limited accuracy and reliability because of the coarse number of cell towers and multipath issues. Some of these methods also require the presence of a GPS signal and a GPS time reference for measuring time of arrival of cellular RF signals. These systems also require time synchronization and prior knowledge of the position of cellular base-stations. Other methods have also used cellular tower triangulation to determine a coarse pre-fix position and use that to assist a GPS system determine the GPS-based position.

The embodiments of the present invention disclosed above overcome these limitations because by using time delay information from existing wireless infrastructure and standards makes the disclosed embodiments low-cost. For instance, the disclosed methods can be applied to existing mobile phones and complement the phone's GPS positioning system, thereby making a hybrid positioning system where the phones are aware of their locations both inside and outside buildings. This avoids the need for installing special tag hardware. The disclosed embodiments are also more sensitive since time of arrival of a signal is directly proportional to distance, whereas the amplitude is proportional to the inverse of distance squared.

The disclosed embodiments do not require a GPS time reference. The disclosed embodiments do not have the accuracy and reliability limitations of cell tower positioning and can be used with Bluetooth®, WLAN, WiMax, HD Radio™, UWB, RFID, ZigBee, and 60 GHz and therefore are broader the previous techniques. The disclosed embodiments can synchronize the RF base-stations and calculate their position. The position obtained by the disclosed RF time of arrival method can also be used to assist a GPS system determine the GPS-based position. Alternatively, the position obtained by our RF time of arrival method can be weighted and combined with a GPS position (when GPS signals are present) in order to calculate a hybrid position that uses both RF and GPS. The disclosed embodiments can synchronize the RF base-stations and calculate their position. The disclosed embodiments are also more accurate and more applicable for indoor positioning situations where GPS and cellular signals can be weak.

IV. Examples of the Application of the Disclosed Embodiments

Once the location of a mobile user is known inside a building or mall, it is possible to enable a wide variety of location-based services. Many location-based services are similar to web-based services that use the browsing location and surfing history of a web user to target certain services to them. This is the business model of successful companies such as Google that target advertising based on the search criteria of the user. Likewise, location-based services can be created based on the physical location of the mobile user and their route history. Referring back to FIG. 12 the mobile can be a user inside a building such as a warehouse, mall, or office. The access points are wireless access points that are spread throughout the building, and the server can be used to track the user and provide location-based services. Typical services are people and asset tracking.

Some location-based services examples are (1) the mobile downloads the map of the building from the server and uses it together with its calculated location and navigation software to get direction to a point of interest (a store, an office number, nearest printer location, etc), (2) targeted advertising deals (using phone text messages or web applications) in a mall or store as a user moves around, (3) description of museum exhibits as a user gets close to the exhibit, (4) people tracking applications such as patients/staff in a hospital, for prisoners/guards in a jail, children tracking in malls/parks, tracking sports players for post game analysis, friends finding each other inside a building, and E911 applications that use indoor wireless networks rather than cellular to locate a person in case of an emergency, (5) security application where only authorized people can access certain locations, (6) credit card fraud detection where the user signs up for a credit monitoring service and the location of the user (using his mobile) is used as an early warning system in case the user's credit card is being used at a store in a different location; the assumption being that the user's phone is close to his/her proximity as he/she requests a credit transaction. If the user's phone location is not close to the store where the transaction is being requested then the transaction is not accepted, (7) police/firefighter/military/emergency response training for urban situations, and (8) intelligent building lighting and heating control based on the location of people, where only areas that are used consume light and heat resources. The following sections describe three examples of using the embodiments of the present invention for providing location-based services.

A. Game Console Usage

Video game consoles from various companies (Sony®, Microsoft®, Nintendo®) have a game console and one or more remotes. The remotes for these products typically use infrared technology and/or short-range wireless technologies such as Bluetooth® to communicate with the game console. Some remotes (e.g. Nintendo® V) also use gyroscopes to sense motion and acceleration. However, these remotes do not provide accurate position information. One application for this invention is to provide accurate positional information of a gaming remote to the game console. Accurate positional information of the remote can then be used to provide new and richer interactive game experiences.

Figure 17:
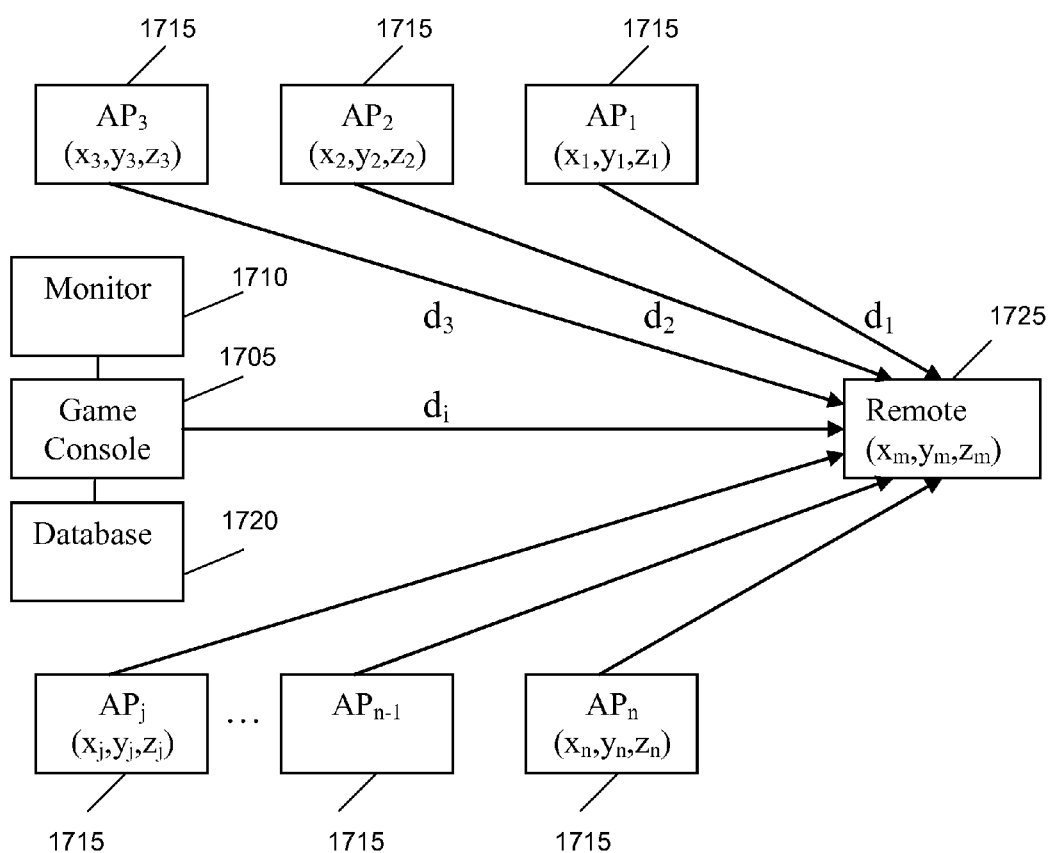
FIG. 17 conceptually illustrates an example of an embodiment where location-based services are used in a game console.

FIG. 17 provides an example of an embodiment where location-based services are used in a game console. The figure shows a game console 1705, a monitor (or display device) 1710, a group of access points (or other transmitting devices) 1715, a remote (remote controller or remote device) 1725 to enable a user to remotely control the game console 1705, and a database 1720. The game console 1705 is typically placed under or above the monitor 1710. In some embodiments, the game console 1705 acts as one of the access points. Extra six or more access points 1715 are scattered around the room. In some embodiments, the game console 1705 acts as the master access point (so that the extra access points are more simple and low-cost). Some embodiments include more than one remote (not shown).

Figure 18:
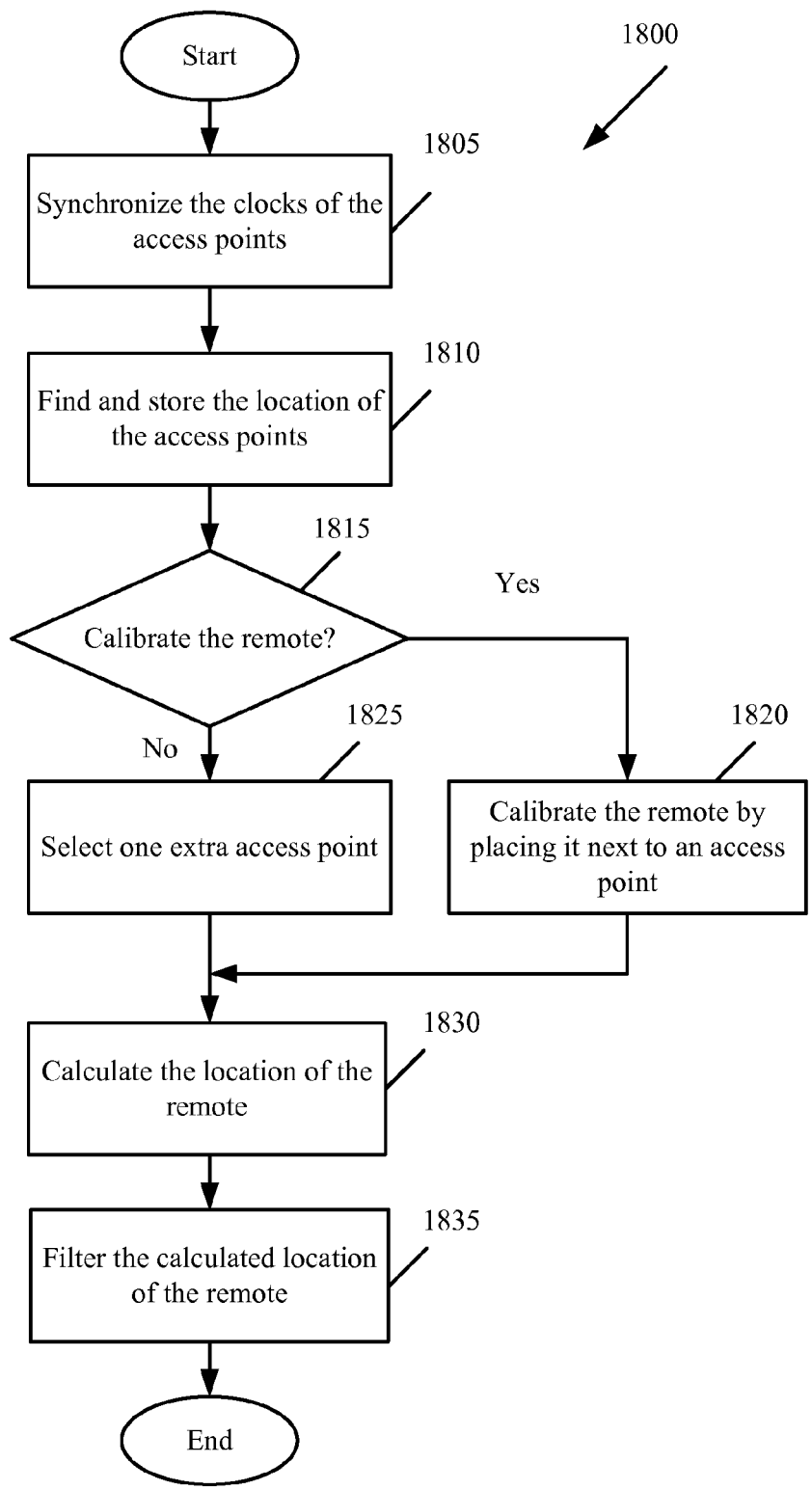
FIG. 18 conceptually illustrates a process for calculating the position of a game remote controller in some embodiments.

FIG. 18 conceptually illustrates a process 1800 for calculating the position of a game remote controller using several access points in some embodiments. As shown in FIG. 18, the process synchronizes (at 1805) the clocks of the different access points. Synchronizing the access points clocks is describes by reference to FIG. 9 above.

Next, the process calculates (at 1810) the positions of the access points if they are not already known. This calculation is described by reference to FIG. 11 above. Once the location of the extra access points relative to the game console is found, the locations are stored together with their MAC IDs in the database 1720. Since seven access points are needed to calculate the location of the access points an extra six access point are needed in addition to the game console, but having more than six will provide better averaging and positioning accuracy.

The process then determines (at 1815) whether to calibrate the remote. When the process determines that calibration is required, the process calibrates (at 1820) the remote. The calibration reduces the number of access points that are needed by one. Otherwise, the process selects (at 1825) one more access point for determining the location of the remote. The calibration is described by reference to FIG. 13 above. Since calibrating the remote is optional, some embodiments skip steps 1815-1825 above. The embodiments that perform remote calibration require only five additional access points 1715 in addition to the game console 1705 to locate the remote 1725.

Next, the process calculates (at 1830) the position of the remote (or remotes) 1725. This calculation is described by reference to FIG. 12 above. The remotes relay their exact position to the game console (using wireless methods such as Bluetooth®, WiFi, or even Infrared) for interactive gaming.

The process then optionally filters and smoothes (at 1835) the calculated location of the remote using previous position and velocity data.

In an alternative embodiment, when the locations of the access points are known then that information together with transmissions between the access points is used to synchronize the clocks of the access points. In some embodiment, when the positions of the access points are known and the remote and/or the access points have more than one antenna the position of the remote is determined without having to synchronize the access points. When the access points have more than one antenna with known separation distances, then fewer access points are needed. These embodiments are described by reference to FIGS. 14-16 above. This application is an easy implementation for this invention since the gaming system is a dedicated stand-alone product and the access points can be made low-cost with simple basebands and small memories.

One of ordinary skill in the art will recognize that process 1800 is a conceptual representation of the operations used to determine the location of a remote. The specific operations of process 1800 may not be performed in the exact order shown and described. The specific operations may not be performed in one continuous series of operations, and different specific operations may be performed in different embodiments. Furthermore, the process could be implemented using several sub-processes, or as part of a larger macro process.

B. Hand Gesture Recognition System

There is interest in developing hand gesture systems for virtual reality systems. One example is the Sixth Sense project at MIT by Pattie Maes, Pranav Mistry (demonstrated as "Unveiling the Sixth Sense, game-changing wearable tech." in 2009 by ted.com, Long Beach, Calif., USA). The following is a description of the SixthSense project from one of Pranav Mistry's web pages:

"The SixthSense prototype is comprised of a pocket projector, a mirror and a camera. Both the projector and the camera are connected to the mobile computing device in the user's pocket. The projector projects visual information enabling surfaces, walls and physical objects around us to be used as interfaces; while the camera recognizes and tracks user's hand gestures and physical objects using computer-vision based techniques. The software program processes the video stream data captured by the camera and tracks the locations of the colored markers (visual tracking fiducials) at the tip of the user's fingers using simple computer-vision techniques. The movements and arrangements of these fiducials are interpreted into gestures that act as interaction instructions for the projected application interfaces."

"The SixthSense prototype implements several applications that demonstrate the usefulness, viability and flexibility of the system. The map application lets the user navigate a map displayed on a nearby surface using hand gestures, similar to gestures supported by Multi-Touch based systems, letting the user zoom in, zoom out or pan using intuitive hand movements. The drawing application lets the user draw on any surface by tracking the fingertip movements of the user's index finger. SixthSense also recognizes user's freehand gestures (postures). For example, the SixthSense system implements a gestural camera that takes photos of the scene the user is looking at by detecting the 'framing' gesture. The user can stop by any surface or wall and flick through the photos he/she has taken. SixthSense also lets the user draw icons or symbols in the air using the movement of the index finger and recognizes those symbols as interaction instructions. For example, drawing a magnifying glass symbol takes the user to the map application or drawing an '@' symbol lets the user check his mail. The SixthSense system also augments physical objects the user is interacting with by projecting more information about these objects projected on them. For example, a newspaper can show live video news or dynamic information can be provided on a regular piece of paper. The gesture of drawing a circle on the user's wrist projects an analog watch."

The positioning system disclosed by the present invention, can be used to improve hand gesture recognition systems like SixthSense. Systems like SixthSense are limited because they require a direct line of sight between the camera and the hand fingers that wear the markers. Furthermore, the use of a video camera and video recognition system for locating the position of the fingers makes these systems expensive and bulky.

Figure 19:
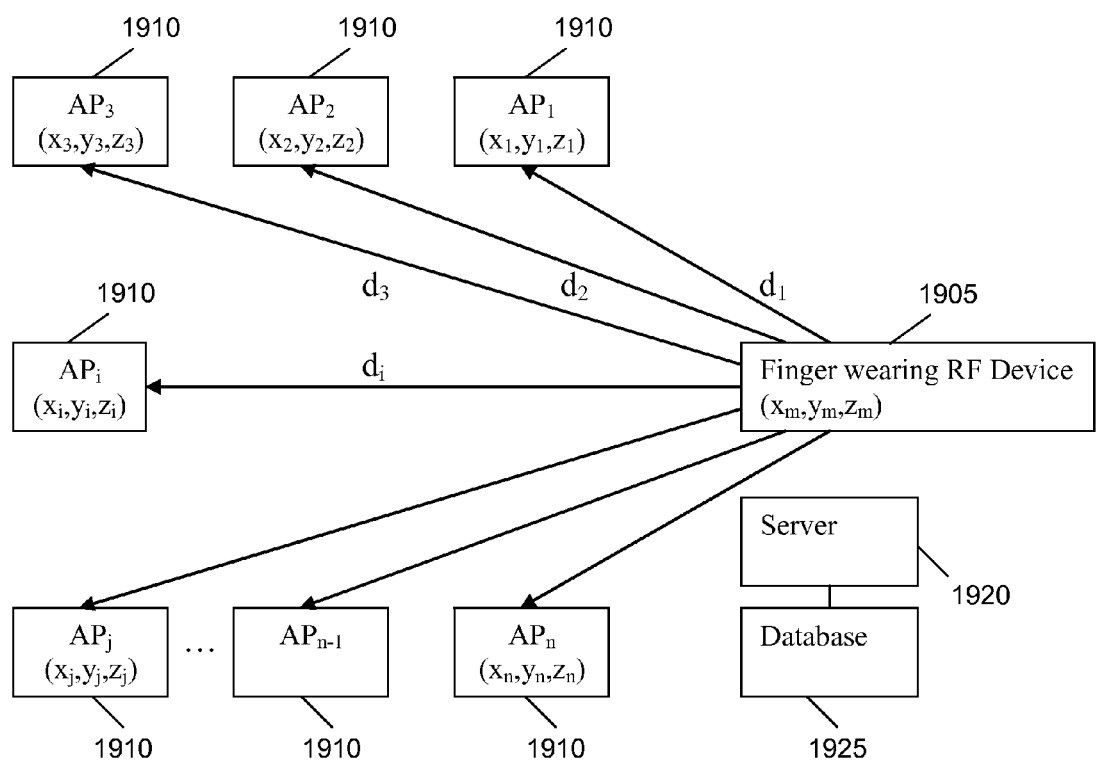
FIG. 19 is a modification of FIG. 12 where a person wears RF devices on some of their fingers in some embodiments FIG. 20 conceptually illustrates a process for calculating the position of each of the RF devices in a hand gesture recognition system in some embodiments.

FIG. 19 is a modification of FIG. 12 where a person wears RF devices 1905 on some of their fingers in some embodiments. Only one finger and one RF device are shown in the figure but as many as all ten fingers could wear such devices. The wireless RF base stations can be mounted or built in a device that the person carries, such as a cell phone. At least seven access points are needed to locate the position of the access points and the fingers (if the access points are calibrated then only six access points are needed to locate the position of the access points and the fingers). If the position of the access points are known in advance, then four access points are needed (one fewer, i.e., three, are needed when the RF devices on the fingers are calibrated as shown in FIG. 13). In the embodiment of FIG. 19, the RF devices transmit to the access points 1910 in order to make the battery-operated finger-wearable RF devices simple and cheap. One of the access points acting as the master can be responsible for scheduling the transmissions. The same master access point or another server 1920 can then process the data to calculate the position of the fingers. However, the system can also be designed such that the access points transmit to the wearable finger RF devices and these devices then estimate their positions and transmit that to a master access point or a server 1920 for storage in a database 1925. Once the positions of the fingers are calculated they can be used for a variety of hand gesture-based virtual reality applications.

Figure 20:
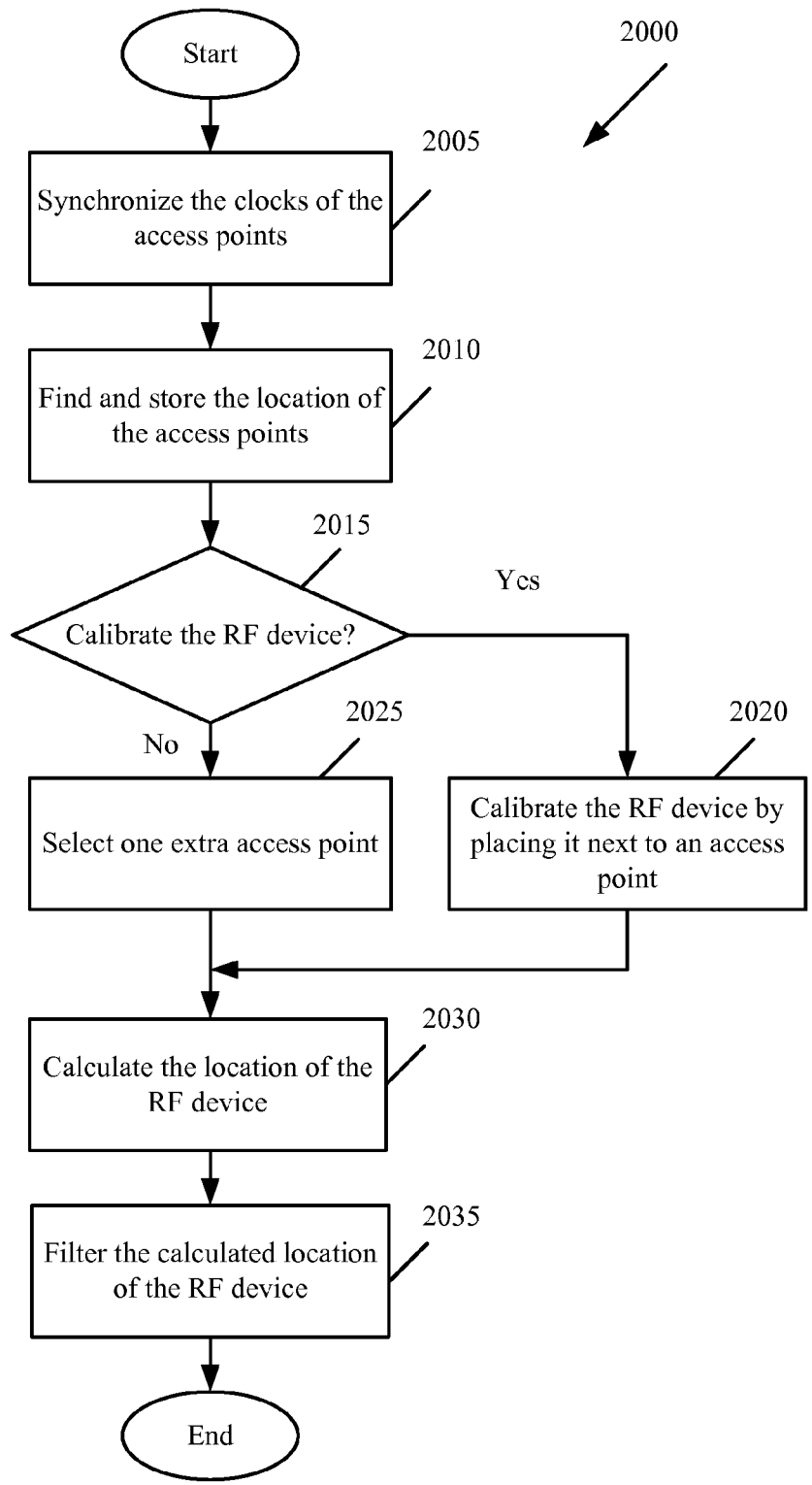

FIG. 20 conceptually illustrates a process 2000 for calculating the position of each of the RF devices 1905 using several access points 1910 for use in a hand gesture recognition system in some embodiments. As shown in FIG. 20, the process synchronizes (at 2005) the clocks of the different access points. Synchronizing the access points clocks is describes by reference to FIG. 9 above.

Next, the process calculates (at 2010) the positions of the access points if they are not already known. This calculation is described by reference to FIG. 11 above. Once the location of the access points is found, the locations are stored together with their MAC IDs in the database 1920.

The process then determines (at 2015) whether to calibrate the RF device. When the process determines that calibration is required, the process calibrates (at 2020) the RF device. The calibration reduces the number of access points that are needed by one. Otherwise, the process selects (at 2025) one more access point for determining the location of the RF device. The calibration is described by reference to FIG. 13 above. Since calibrating the remote is optional, some embodiments skip steps 2015-2025 above. The embodiments that perform RF device calibration require only six access points 1910.

Next, the process calculates (at 2030) the position of the RF device 1905. This calculation is described by reference to FIG. 12 above. In some embodiments, the RF device transmits to the access points 1910 in order to make the battery-operated finger-wearable RF device simple and cheap. In these embodiments, one of the access points acting as the master can be responsible for scheduling the transmissions. The same master access point or another server 1920 can then process the data to calculate the position of the fingers. In other embodiments, the access points transmit to the wearable finger RF device and the RF device then estimates its position and transmits that to a master access point or a server 1920 for storage in a database 1925. The position of the RF device is relayed to a master access point (one of the access points 1910) or a server 1930 (using wireless methods such as Bluetooth®, WiFi, or even Infrared) for interactive gaming. The process then optionally filters and smoothes (at 2035) the calculated location of the RF devices using previous position and velocity data.

In an alternative embodiment, when the locations of the access points are known then that information together with transmissions between the access points is used to synchronize the clocks of the access points. In some embodiment, when the positions of the access points are known and the RF devices and/or the access points have more than one antenna the position of each RF device is determined without having to synchronize the access points. When the access points have more than one antenna with known separation distances, then fewer access points are needed. These embodiments are described by reference to FIGS. 14-16 above. Process 2000 is used to determine the location of several RF devices when there are more than one RF device worn on the fingers of the user.

One of ordinary skill in the art will recognize that process 2000 is a conceptual representation of the operations used to determine the location of an RF device for a hand gesture recognition system. The specific operations of process 2000 may not be performed in the exact order shown and described. The specific operations may not be performed in one continuous series of operations, and different specific operations may be performed in different embodiments. Furthermore, the process could be implemented using several sub-processes, or as part of a larger macro process.

C. Location Service Based on Prior Access Point Data Measurements

Some authors have developed outdoor location-based services where initially a database is created of Wi-Fi access points in a metropolitan area, and then that information together with the amplitude of the received signal beacons from the access points is used to locate a Wi-Fi enabled device. See, U.S. Patent Publication No. 2006/0217131, published on Sep. 28, 2006, entitled "Location-based services that choose location based on number of detected access points within range of user device", by Farshid Alizadeh-Shabdiz, Russel K. Jones, Edward J. Morgan, and Michael G. Shean. The accuracy of this method depends on the accuracy of the estimated position of the access points. The authors above use a fleet of vehicles that drive around in metropolitan areas and record the location of the vehicles using GPS together with the amplitude and the MAC ID of the 802.11 signals that are received from surrounding access points. This data is then processed to estimate the location of the access points. The accuracy of these estimated access point positions depends greatly on how the vehicles drive around to cover the area of interest. Furthermore, the amplitude of the received signal is proportional to the inverse of distance squared ($1/d^2$). The technique in this invention uses time of arrival delay information which is directly proportional to distance. Hence, it can produce a more accurate database for the location of the access points and the mobile, as shown in FIG. 21.

FIG. 21 shows a scanning vehicle (or moving scanner) 2105 that uses a commercial grade GPS to communicate with satellites 2110 in order to calculate its own position in some embodiments. The scanning vehicle also includes four or more synchronized wireless access points 2115 (one of which is a master) at known fixed locations relative to the vehicle 2105. As the vehicle 1705 moves through the streets its access points 2115 communicate with the wireless access points 2120-2122 in nearby buildings 2125. Unique identifiers such as the MAC addresses are used to distinguish between different access points. FIG. 21 shows the case where an access point 2122 in a building transmits and the access points 2115 in the vehicle 2105 receive. Since the position of the vehicle's access points are known (using GPS and their fixed relative positions in the car) then the time delays can be stored and processed by a master access point or a server 2130 to calculate the position of the access point in the building (using equation (Eqn. 1)) and store them in a database (not shown). The vehicle can also move to other locations and repeat the above procedure with the same access point in order to average out the calculated position of the access point and further improve accuracy. This database needs to be updated periodically if the access points move. FIG. 21 shows a scanning vehicle in a street setting. However, a smaller scanning vehicle (e.g., a push cart or a small motorized vehicle) can also be used in an indoor building setting such as a mall or office building.

The database of accurate access point locations resulting from this invention can be used in several ways. First, wireless devices can use the accurate database of access point locations and the time of arrival methods outlined in this invention to calculate their location. When the clocks of the access points in the buildings in FIG. 21 are synchronized, the method described by reference to FIG. 12 is used to locate the mobile wireless device. When the clocks of the access points in the buildings in FIG. 21 are not synchronized but the mobile wireless device has more than one antenna, the method described by reference to FIG. 14 is used to locate the mobile device. The difference here is that the locations of the access points are calculated a priori from a vehicle scanning the environment (as shown in FIG. 21) as opposed to the access points communicating with each other (as shown in FIG. 11). FIGS. 14 and 15 are more suitable approaches if it is not possible to synchronize the access points because they are in separate domains/networks and belong to different organizations/owners (e.g. access points in homes, companies around a city, or individual stores in a mall being used for navigation in order to complement GPS where GPS signals are weak). FIGS. 8 and 12 are more applicable to situations where the access points belong to organizations and there is control over them (e.g. dedicated access points belonging to a city, a mall owner or a corporation's buildings for providing location-based services where GPS signals are weak).

Second, amplitude-based beacon signal triangulation methods such as the above mentioned US Publication No. 2006/0217131 can use this database instead of theirs in order to produce a more accurate location for mobile wireless devices that use their system.

Third, a hybrid coarse-to-fine scheme can be devised where amplitude-based beacon signal triangulation methods such as US Publication No. 2006/0217131 calculate a coarse position for the location of the mobile wireless device and then that position is used as a starting solution for the time of arrival method outlined in this invention (FIG. 12 or FIG. 14).

V. Computer System

Many of the above-described processes and modules are implemented as software processes that are specified as a set of instructions recorded on a computer readable storage medium (also referred to as "computer readable medium" or "machine readable medium"). These instructions are executed by one or more computational elements, such as one or more processing units of one or more processors or other computational elements like Application-Specific ICs ("ASIC") and Field Programmable Gate Arrays ("FPGA"). The execution of these instructions causes the set of computational elements to perform the actions indicated in the instructions. Computer is meant in its broadest sense, and can include any electronic device with a processor (e.g., moving scanner, mobile device, access point, etc.). Examples of computer readable media include, but are not limited to, CD-ROMs, flash drives, RAM chips, hard drives, EPROMs, etc. The computer readable media does not include carrier waves and/or electronic signals passing wirelessly or over wired connection.

In this specification, the term "software" includes firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 22:
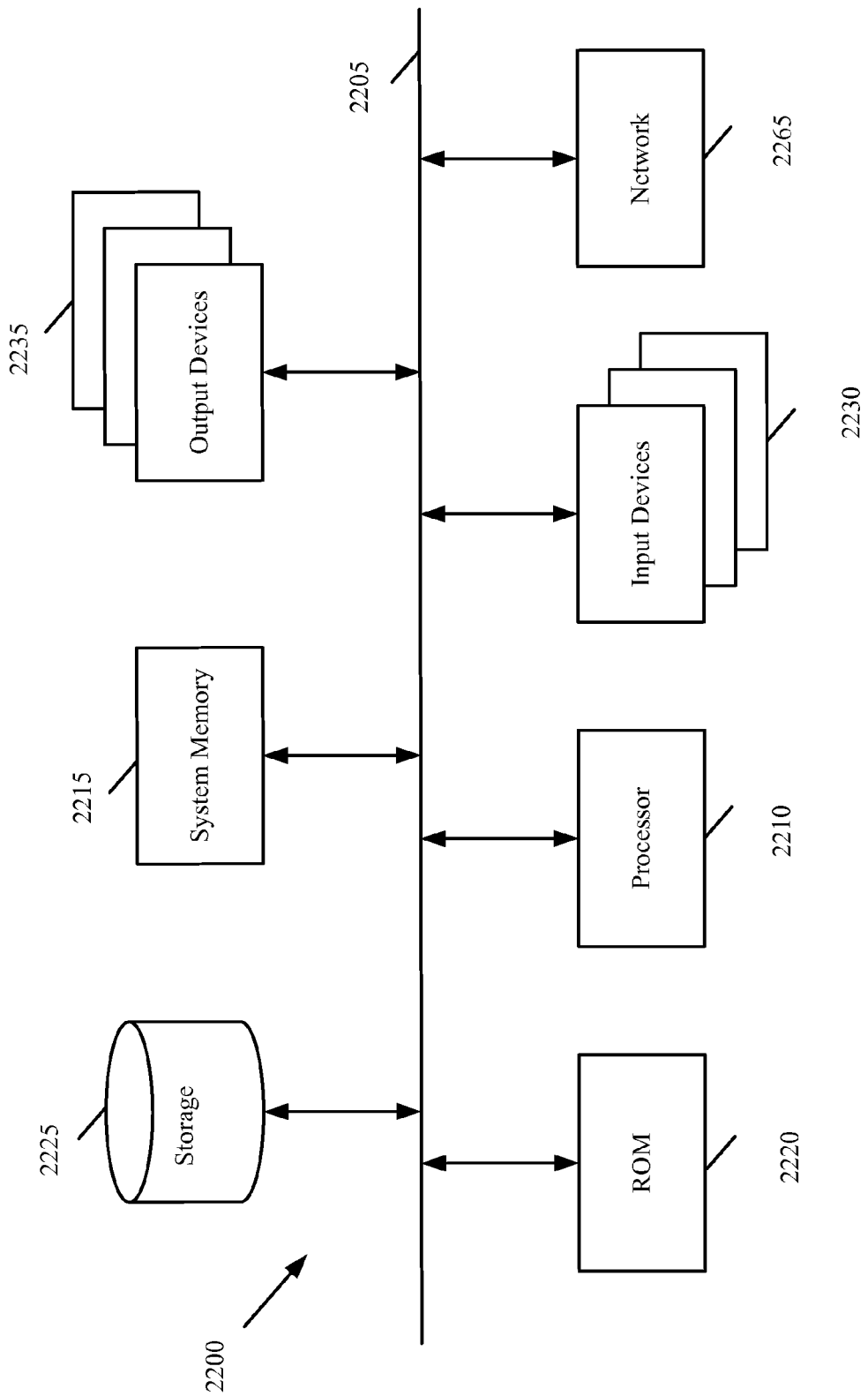
FIG. 22 conceptually illustrates a computer system with which some embodiments of the invention are implemented.

FIG. 22 conceptually illustrates a computer system with which some embodiments of the invention are implemented. The computer system 2200 includes a bus 2205, a processor 2210, a system memory 2215, a read-only memory 2220, a permanent storage device 2225, input devices 2230, and output devices 2235.

The bus 2205 collectively represents all system, peripheral, and chipset buses that support communication among internal devices of the computer system 2200. For instance, the bus 2205 communicatively connects the processor 2210 with the read-only memory 2220, the system memory 2215, and the permanent storage device 2225.

From these various memory units, the processor 2210 retrieves instructions to execute and data to process in order to execute the processes of the invention. In some embodiments the processor comprises a FPGA, an ASIC, or various other electronic components for executing instructions. The read-only-memory (ROM) 2220 stores static data and instructions that are needed by the processor 2210 and other modules of the computer system. The permanent storage device 2225, on the other hand, is a read-and-write memory device. This device is a non-volatile memory unit that stores instruction and data even when the computer system 2200 is off. Some embodiments of the invention use a mass-storage device (such as a magnetic or optical disk and its corresponding disk drive) as the permanent storage device 2225. Some embodiments use one or more removable storage devices (flash memory card or memory stick) as the permanent storage device.

Like the permanent storage device 2225, the system memory 2215 is a read-and-write memory device. However, unlike storage device 2225, the system memory is a volatile read-and-write memory, such as a random access memory. The system memory stores some of the instructions and data that the processor needs at runtime.

Instructions and/or data needed to perform processes of some embodiments are stored in the system memory 2215, the permanent storage device 2225, the read-only memory 2220, or any combination of the three. For example, the various memory units include instructions for processing multimedia items in accordance with some embodiments. From these various memory units, the processor 2210 retrieves instructions to execute and data to process in order to execute the processes of some embodiments.

The bus 2205 also connects to the input and output devices 2230 and 2235. The input devices enable the user to communicate information and select commands to the computer system. The input devices 2230 include alphanumeric keyboards and cursor-controllers. The output devices 2235 display images generated by the computer system. The output devices include printers and display devices, such as cathode ray tubes (CRT) or liquid crystal displays (LCD). Finally, as shown in FIG. 22, bus 2205 also couples computer 2200 to a network 2265 through a network adapter (not shown). In this manner, the computer can be a part of a network of computers (such as a local area network ("LAN"), a wide area network ("WAN"), or an Intranet) or a network of networks (such as the Internet).

Any or all of the components of computer system 2200 may be used in conjunction with the invention. For instance, some or all components of the computer system described with regards to FIG. 22 comprise some embodiments of the mobile device, access point, and server described above. However, one of ordinary skill in the art will appreciate that any other system configuration may also be used in conjunction with the invention or components of the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The computer-readable media may store a computer program that is executable by at least one processor and includes sets of instructions for performing various operations. Examples of hardware devices configured to store and execute sets of instructions include, but are not limited to application specific integrated circuits (ASICs), field programmable gate arrays (FPGA), programmable logic devices (PLDs), ROM, and RAM devices. Examples of computer programs or computer code include machine code, such as produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium", "computer readable media", "machine readable medium", and "machine readable media" are entirely restricted to non-transitory, tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A method of determining a location of a mobile device, the method comprising:
   receiving a signal with a known radio transmission pattern at the mobile device from each of a plurality of transmitting devices;
   correlating each received signal with a corresponding signal that has a same known radio transmission pattern to determine a time the signal traveled between each of the plurality of transmitting devices and the mobile device; and
   determining the location of the mobile device based on the time the signal travelled between each of the plurality of transmitting devices and the mobile device.

2. The method of claim 1, wherein determining the location of the mobile device does not require calculating a distance between the mobile device and any of the transmitting devices.

3. The method of claim 1, wherein determining the location of the mobile device comprises solving a function that is dependent on the time the signal traveled between each of the plurality of transmitting devices and the mobile device.

4. The method of claim 1, wherein the known radio transmission pattern comprises a known signal preamble, wherein correlating each received signal with a corresponding signal comprises correlating the preamble of the received signal with the preamble of the corresponding signal with the same known radio transmission pattern.

5. The method of claim 1, wherein at least one received signal comprises a plurality of pilots, the method further comprising extracting the pilots from the signal, wherein determining the time the signal travelled between the transmitting device that transmitted the signal comprising the plurality of pilots and the mobile device further comprises using said extracted pilots.

6. The method of claim 1, wherein the corresponding signals that have the same known radio transmission pattern are signals with known signatures stored at the mobile device.

7. The method of claim 1, wherein the mobile device and each of the transmitting devices comprise a clock, wherein the mobile device and each transmitting device comprise a set of radio frequency (RF) components, the method further comprising:
   synchronizing the clocks of the transmitting devices;
   placing the mobile device next to one of the transmitting devices; and
   calculating a constant delay comprising (i) an offset of the mobile device clock with respect to the clocks of the transmitting devices, (ii) a delay caused by the mobile device RF components, and (iii) a delay caused by each transmitting device RF components,
   wherein determining the location of the mobile device comprises using the calculated constant delay.

8. The method of claim 1, wherein each of the transmitting devices comprises a clock, wherein the clocks of the transmitting devices are not synchronized with each other.

9. The method of claim 1 further comprising sending an acknowledgement signal from the mobile device to each of the transmitting devices,
   wherein determining the time the signal travelled between each transmitting device and the mobile device further comprises determining a round trip time that the signal travelled from the transmitting device that transmitted the signal to the mobile device and the acknowledgement signal traveled from the mobile device to the transmitting device that transmitted the signal.

10. The method of claim 1, wherein determining the time the signal travelled between each transmitting device and the mobile device comprises:
    measuring a power in the received signal; and
    determining a time when the power of the received signal transits from a first value to a second value, the second value corresponding to a higher power level than the first value.

11. A system for playing games, the system comprising:
    a game console for playing a game;
    a remote controller for controlling a game played on the game console; and
    a plurality of transmitting devices communicatively coupled to the remote controller, wherein each transmitting device is configured to transmit one or more signals with known radio transmission patterns to the remote controller,
    wherein the remote controller is configured (i) to receive the signals from the plurality of transmitting devices, (ii) to correlate each received signal with a corresponding signal that has a same known radio transmission pattern to determine a time the signal traveled between each of the plurality of transmitting devices and the remote controller, and (iii) to determine a location of the remote controller based on the time the signal travelled between the plurality of transmitting devices and the remote controller.

12. The system of claim 11, wherein determining the location of the remote controller does not require calculating a distance between the remote controller and any of the transmitting devices.

13. The system of claim 11, wherein the known radio transmission pattern comprises a known signal preamble, wherein correlating each received signal with a corresponding signal comprises correlating the preamble of the received signal with the preamble of the corresponding signal with the same known radio transmission pattern.

14. The system of claim 11, wherein determining the location of the remote controller comprises solving a function that is dependent on the time the signal traveled between each of the plurality of transmitting devices and the remote controller.

15. The system of claim 11, wherein determining the time the signal travelled between each transmitting device and the remote controller comprises:
    measuring a power in the received signal; and
    determining a time when the power of the received signal transits from a first value to a second value, the second value corresponding to a higher power level than the first value.

16. A system for determining a hand gesture of a human, the system comprising:
    a radio frequency (RF) device for placing on a finger of the human, wherein the RF device is configured to transmit signals with known radio transmission patterns; and
    a plurality of receiving devices communicatively coupled to the RF device, wherein each receiving device is configured (i) to receive signals with the known radio transmission patterns from the RF device and (ii) to correlate the received signals with a corresponding signal that has a same known radio transmission pattern to determine a time the signal traveled between the RF device and the receiving device, wherein at least one of the receiving devices is further configured (i) to receive the time the signal traveled between the RF device and each of the other receiving devices from the other receiving devices and (ii) to determine a location of the RF device based on the time the signal travelled between the RF device and each of the receiving devices.

17. The system of claim 16 further comprising a plurality of RF devices, wherein one of the receiving devices is further configured to schedule the transmission of the signals from each of the plurality of RF devices to the receiving devices.

18. The system of claim 16, wherein determining the location of the RF device does not require calculating a distance between the RF device and any of the receiving devices.

19. The system of claim 16, wherein determining the location of the RF device comprises solving a function that is dependent on the time the signal traveled between the RF device and each of the plurality of receiving devices.

20. The system of claim 16, wherein determining the time the signal travelled between the RF device and each receiving device comprises:
  measuring a power in the received signal; and
  determining a time when the power of the received signal transits from a first value to a second value, the second value corresponding to a higher power level than the first value.

21. The system of claim 16, wherein the known radio transmission pattern comprises a known signal preamble, wherein correlating each received signal with a corresponding signal comprises correlating the preamble of the received signal with the preamble of the corresponding signal with the same known radio transmission pattern.

22. The system of claim 16, wherein at least one received signal comprises a plurality of pilots, wherein determining the time the signal travelled between the RF device and each receiving device further comprises (i) extracting the pilots from the signal and (ii) using said extracted pilot signal.

23. The system of claim 16, wherein the corresponding signals that have the same known radio transmission pattern are signals with known signatures stored at said at least one receiving device.

24. The system of claim 16, wherein each of the receiving devices comprises a clock, wherein the clocks of the receiving devices are not synchronized with each other.

25. The system of claim 16, wherein each of the receiving devices is further configured to send an acknowledgement signal to the RF device,
  wherein determining the time the signal travelled between the RF device and each receiving device comprises determining a round trip time that the signal travelled from the RF device to the receiving device and the acknowledgement signal traveled from the receiving device to the RF device.

26. The system of claim 11, wherein at least one received signal comprises a plurality of pilots, wherein determining the time the signal travelled between the transmitting device that transmitted the signal comprising the plurality of pilots and the remote controller further comprises (i) extracting the pilots from the signal and (ii) using said extracted pilots.

27. The system of claim 11, wherein the corresponding signals that have the same known radio transmission pattern are signals with known signatures stored at the remote controller.

28. The system of claim 11, wherein each of the transmitting devices comprises a clock, wherein the clocks of the transmitting devices are not synchronized with each other.

29. The system of claim 11, wherein the remote controller is further configured to send an acknowledgement signal to each of the transmitting devices,
  wherein determining the time the signal travelled between each transmitting device and the remote controller further comprises determining a round trip time that the signal travelled from the transmitting device that transmitted the signal to the remote controller and the acknowledgement signal traveled from the remote controller to the transmitting device that transmitted the signal.

* * * * *